United States Patent [19]

Tsutsui et al.

[11] Patent Number: 5,800,308
[45] Date of Patent: Sep. 1, 1998

[54] PRESSURE CONTROL OF HYDRAULIC SERVOS WHILE IN GEAR AT A STOPPED NEUTRAL STATE

[75] Inventors: Hiroshi Tsutsui, Nishio; Kazumasa Tsukamoto, Toyota; Masahiro Hayabuchi; Masaaki Nishida, both of Anjo; Yoshihisa Yamamoto, Nishio, all of Japan

[73] Assignee: Aisin AW Co., Ltd., Japan

[21] Appl. No.: 644,444

[22] Filed: May 13, 1996

[30] Foreign Application Priority Data

May 12, 1995 [JP] Japan .................... 7-115013
Aug. 31, 1995 [JP] Japan .................... 7-224310

[51] Int. Cl.$^6$ ........................... F16H 61/20
[52] U.S. Cl. ................. 477/116; 477/117; 477/156
[58] Field of Search ................. 477/114, 116, 477/117, 143, 156, 158

[56] References Cited

U.S. PATENT DOCUMENTS

| | | | |
|---|---|---|---|
| 4,982,622 | 1/1991 | Yamamoto et al. | 477/117 |
| 5,272,630 | 12/1993 | Brown et al. | 364/424.1 |
| 5,301,572 | 4/1994 | Tanaka et al. | 477/116 |
| 5,307,727 | 5/1994 | Berger et al. | 91/29 |
| 5,343,782 | 9/1994 | Jamzadeh | 477/156 |
| 5,363,724 | 11/1994 | Asahara et al. | 477/143 |
| 5,527,236 | 6/1996 | Kimura et al. | 477/156 X |
| 5,558,599 | 9/1996 | Tsukamoto et al. | 477/117 X |
| 5,586,954 | 12/1996 | Iwata et al. | 477/114 X |

FOREIGN PATENT DOCUMENTS

| | | |
|---|---|---|
| 0482689 | 4/1992 | European Pat. Off. . |
| 0588443 | 3/1994 | European Pat. Off. . |
| 220260 | 11/1985 | Japan . |

Primary Examiner—Khoi Q. Ta
Attorney, Agent, or Firm—Lorusso & Loud

[57] ABSTRACT

A control system for an automatic transmission operates a clutch for disengaging a transmission mechanism when a vehicle is stopped and idling with the brake pedal depressed while the gear shift is in a forward gear. The clutch is maintained at a drag state (friction elements disengaged but oil causing some torque transmission) bordering a slip state (friction elements engaged) When a neutral control is started, the clutch is released until the retraction of the piston of the hydraulic servo is started. When the rate of change in a rotational difference does not exceeds a reference rate of change even after a set time has elapsed, booster means of specific release state holding means decides that the clutch is in a drag region, and raises an oil pressure to be fed to the hydraulic servo, by a set pressure. On the other hand, when the rate of change exceeds the reference rate and the rotational difference increases, irrespective of the lapse of a set time, the first pressure reducing means of the specific release state holding means decides that the clutch is in a slip region, and lowers the oil pressure to be fed to the hydraulic servo, by a set pressure. As a result, the clutch is always held in a state which is immediately before the transfer from the drag region to the slip region.

5 Claims, 20 Drawing Sheets

|  | | Solenoid | | | Clutch | | | Brake | | | | One-Way Clutch | | |
|---|---|---|---|---|---|---|---|---|---|---|---|---|---|---|
|  | | S1 | S2 | S3 | C1 | C2 | C3 | B1 | B2 | B3 | B4 | F1 | F2 | F3 |
| R | | × | ○ | × | × | ○ | × | × | × | ○ | ○ | × | × | × |
| N | | × | ○ | × | × | × | × | × | × | × | ○ | × | × | × |
| D | 1 ST | × | ○ | △ | ○ | × | × | × | × | (○) | ○ | × | ○ | ○ |
| D | 2 ND | ○ | ○ | △ | ○ | × | × | ○ | ○ | × | ○ | ○ | × | ○ |
| D | 3 RD | ○ | × | × | ○ | × | ○ | ○ | ○ | × | × | ○ | × | × |
| D | 4 TH | × | × | × | ○ | ○ | ○ | × | ○ | × | × | × | × | × |

*FIG. 3*

PRESSURE CONTROL OF HYDRAULIC SERVOS WHILE IN GEAR AT A STOPPED NEUTRAL STATE

BACKGROUND OF THE INVENTION

1. Field of the Invention

The present invention relates to an automatic transmission for a vehicle and, more particularly, to a control system for the automatic transmission.

2. Related Art

In automatic transmissions of the prior art, rotation generated by the engine is transmitted through a fluid transmission unit such as a torque converter to a speed change unit in which the rotation speed is changed. Between the fluid transmission unit and the speed change unit, there is a first clutch (or input clutch) which can be applied/ released to interchange a neutral range (as will be called the "N-range") and a forward running range (as will be called the "D-range").

In the automatic transmission, on the other hand, when the vehicle is stopped with the D-range being selected, the neutral control is effected by reducing the engaging force of the first clutch thereby to reduce the load to be applied to the engine to improve the fuel economy and to prevent the vehicle from vibrating.

The oil pressure fed to the hydraulic servo of the first clutch is controlled in a feedback manner to set the difference between the input RPM and the output RPM so that the first clutch may come into sliding engagement. When the first clutch is applied again, the sliding engagement prevents the first clutch from having its engagement delayed by the loss stroke of the piston of the hydraulic servo, thereby preventing racing and application shock of the engine (as disclosed in Japanese Patent Publication No. 35869/1988).

Because the first clutch in the control system of the prior art is brought into sliding engagement, torque from the engine is transmitted to the speed change unit so that the fuel economy is accordingly deteriorated to cause idle vibrations in the vehicle. Due to the slipping engagement, the friction elements of the first clutch generate heat or have less durability.

SUMMARY OF THE INVENTION

An object of the present invention is to solve the aforementioned problems of the control system for an automatic transmission of the prior art and to provide a control system for an automatic transmission which can prevent racing or application shock of the engine due to clutch engagement delay and prevent vibration during idling of a vehicle while reducing heat generation and increasing durability of the friction elements of the clutch.

According to a first aspect of the present invention, there is provided a control system for an automatic transmission having a speed change unit with a transmission mechanism. The control system includes a fluid transmission unit for transmitting rotation of an engine to the speed change unit; a clutch adapted to be applied when a forward running range is selected to transmit the rotation of the fluid transmission unit to the transmission mechanism of the speed change unit; a hydraulic servo for applying/releasing the clutch; stop state detecting facilities for detecting a vehicle stop state which is defined by (a) a forward running range being selected, (b) a throttle opening being fully closed, (c) a brake pedal being depressed, and (d) a vehicle speed being substantially zero; input speed detecting facilities for detecting the input rotational speed of the fluid transmission unit; output speed detecting facilities for detecting the output rotational speed of the fluid transmission unit; hydraulic control facilities for controlling oil pressure fed to the hydraulic servo; and a control unit. The control unit includes calculation facilities for calculating the rotational difference between the input speed and the output speed; release facilities for releasing the clutch by lowering the oil pressure fed to the hydraulic servo until the retraction of the piston of the hydraulic servo is started when the vehicle stop state is detected; and specific release state holding facilities for holding the clutch in a released state immediately before the transfer of the clutch from a drag region (non-engaged state) to a slip region (engaged state) until the vehicle stop state is not detected after the release of the clutch. The specific release state holding facilities includes booster facilities for raising the oil pressure fed to the hydraulic servo by a set pressure unless a rate of change of the rotational difference exceeds a reference rate of change even after lapse of a set time period; and first pressure reducing facilities for lowering the oil pressure fed to the hydraulic servo by a set pressure if the rate of change exceeds the reference rate irrespective of the lapse of the set time period and if the rotational difference increases.

If it is decided by the stop state detecting facilities that the forward running range is selected, that the throttle opening is fully closed, that the brake pedal is depressed and that the vehicle speed is substantially zero, the neutral control is started.

The release facilities releases the clutch by lowering the oil pressure fed to the hydraulic servo until the retraction of the piston of the hydraulic servo is started.

The booster facilities decides that the clutch is in the drag region, if the rate of change of the rotational difference does not exceed the reference rate of change, and raises the oil pressure to be fed to the hydraulic servo by the set pressure. On the other hand, the first pressure reducing means decides that the clutch is in the slip region, if the rate of change exceeds the reference rate of change irrespective of the lapse of the set time and if the rotational difference increases, and lowers the oil pressure to be fed to the hydraulic servo by the set pressure.

Thus, the oil pressure to be fed to the hydraulic servo is lowered at the instant of the transfer of the clutch from the drag region to the slip region, so that it is always held in a stroke-end non-engaging state which is the state immediately before the transfer from the drag region to the slip region.

Thus, the individual friction elements of the clutch are barely brought into abutment against each other so that the torque transmitted from the engine to the speed change unit is remarkably reduced.

As a result, it is possible to improve fuel economy along with preventing vibration when the vehicle is idling. It is further possible to prevent the generation of heat and the deterioration in durability or life of the individual friction elements of the clutch.

Since the piston of the hydraulic servo is held immediately ahead of the stroke end position, its loss stroke can be reduced. It is possible to prevent the delay in the engagement, as might otherwise be caused by the loss stroke. As a result, it is possible to prevent racing and engagement shock of the engine.

According to a further aspect of the present invention, the reference rate of change is set at a value between a standard rate of change when the clutch is in the drag region, if the oil pressure is changed by the set pressure, and a standard rate of change when the clutch is in the slip region.

In this case, it can be easily decided whether the clutch is in the drag region or in the slip region.

According to a further aspect of the present invention, the set time period is set to correspond to a time period during which the oil pressure fed to the hydraulic servo continues to be changed by the set pressure until the actual rate of change of the oil pressure ends.

Since, in this case, the oil pressure is raised after the delay in the rise of the oil pressure in the hydraulic servo has passed, delays are not accumulated so that overshoot can be prevented at the time of transfer of the clutch from the drag region to the slip region.

It is further possible to prevent the piston of the hydraulic servo from retracting more than necessary.

According to a further aspect of the present invention, this release facilities includes second pressure reducing facilities for reducing the oil pressure fed to the hydraulic servo, by the set pressure if the rate of change exceeds the reference rate of change before the set time elapses and if the rotational difference decreases.

In this case, the clutch can be brought back to non-engagement without waiting for elapse of the set time.

According to a further aspect of the present invention, the reference rate of change, as set by the second pressure reducing facilities, is higher than that which is set by the specific release state holding facilities.

In this case, it is possible to set the reference rates of change to suit the second pressure reducing facilities and the specific release state holding facilities, respectively.

As a result, the region is not decided by mistake to belong to the slip region although it has already transferred to the drag region. The variation of the rotational difference is not compared with the threshold value after it has increased, so that the clutch can be prevented from vibrating.

BRIEF DESCRIPTION OF THE DRAWINGS

FIG. 3 is a table setting forth the operation of the automatic transmission of FIG. 2;

DESCRIPTION OF THE PREFERRED EMBODIMENTS

Figure 1:
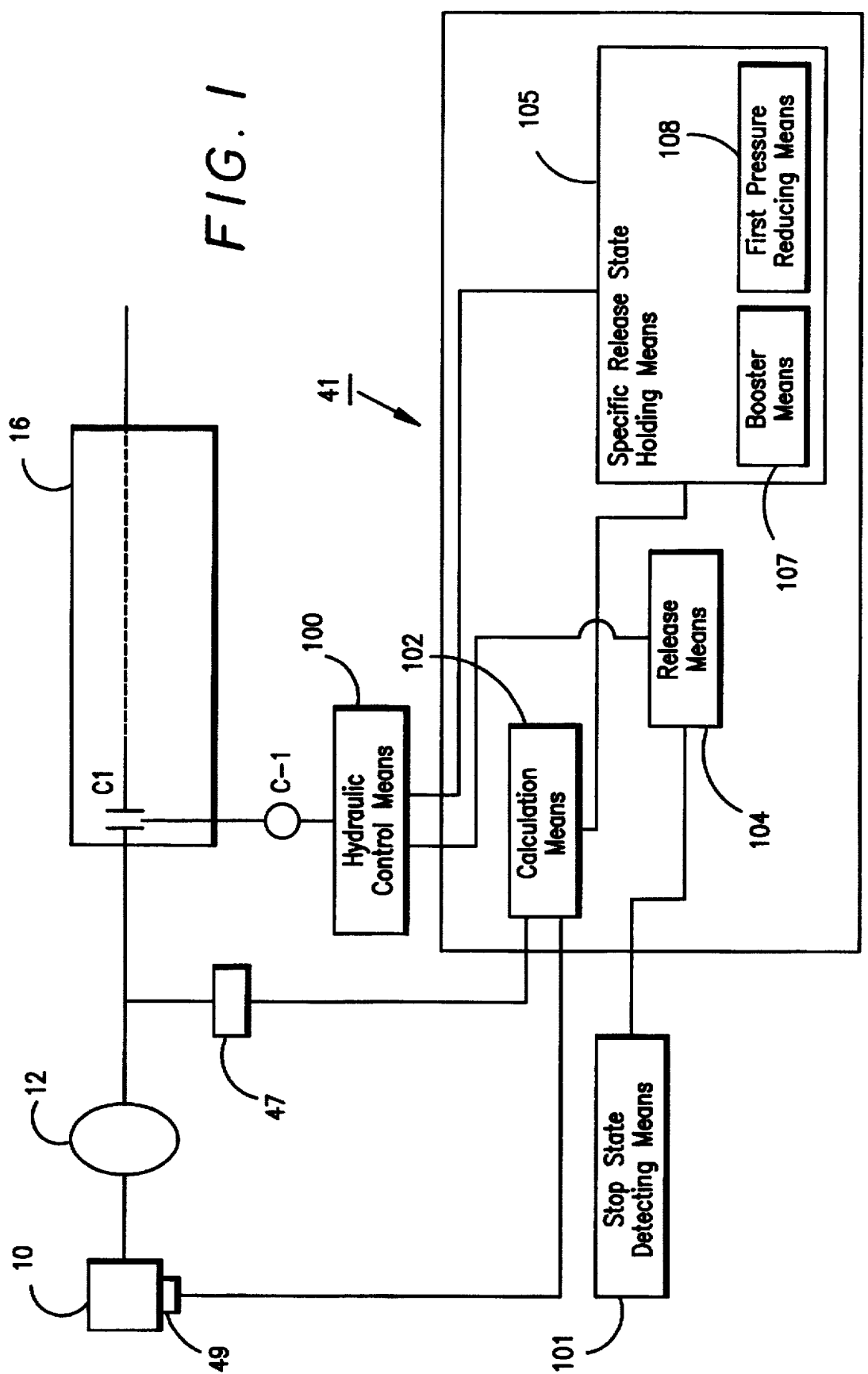
FIG. 1 is a functional block diagram of a control system or an automatic transmission of first embodiment of the present invention.

One embodiment of a control system for an automatic transmission in accordance with the present invention, is shown in FIG. 1, wherein: reference numeral 10 designates an engine; numeral 12 designates a torque converter acting as a fluid transmission unit for transmitting the rotation of the engine 10 to a speed change unit 16; characters C1 designate a first clutch acting as a clutch to be applied, when D-range is selected, for transmitting rotation from the torque converter 12 to the transmission mechanism of the speed change unit 16; characters C-1 designate a hydraulic servo for applying/releasing the first clutch C1; and numeral 100 designates hydraulic control means for controlling the oil pressure fed to the hydraulic servo C-1.

Additionally, reference numeral 41 designates an automatic transmission control system; numeral 49 designates an engine RPM sensor acting as input RPM detecting means for detecting the input rotational speed of the torque converter 12; numeral 47 designates an RPM sensor acting as output RPM detecting means for detecting the output rotational speed of the torque converter 12; and numeral 101 designates stop state detecting means for detecting a vehicle stop state. The vehicle stop state is defined as the state satisfying the conditions: (a) a forward running range is selected, (b) a throttle opening θ is fully closed, (c) the brake pedal is depressed, and (d) the vehicle speed is substantially zero. The automatic transmission control system 41 is provided with: calculation means 102 for calculating the rotational difference between the input RPM and the output RPM; release means 104 for releasing the first clutch C1 by lowering the oil pressure fed to the hydraulic servo C-1 until the retraction of the piston of the hydraulic servo C-1 is started while the vehicle stop state is detected; and specific release state holding means 105 for holding the first clutch C1 in a state immediately before the transfer from a drag region to a slip region until an absence of the vehicle stop state is detected.

The specific release state holding means 105 is equipped with booster means 107 for boosting the oil pressure fed to the hydraulic servo C-1, by a set pressure unless the rate of change of the aforementioned rotational difference exceeds a reference rate even after lapse of a set time period, and first pressure reducing means 108 for lowering the oil pressure fed to the hydraulic servo C-1, by a set pressure if the change of rate exceeds the reference rate irrespective of the lapse of the set time period and if the rotational difference increases.

Figure 2:
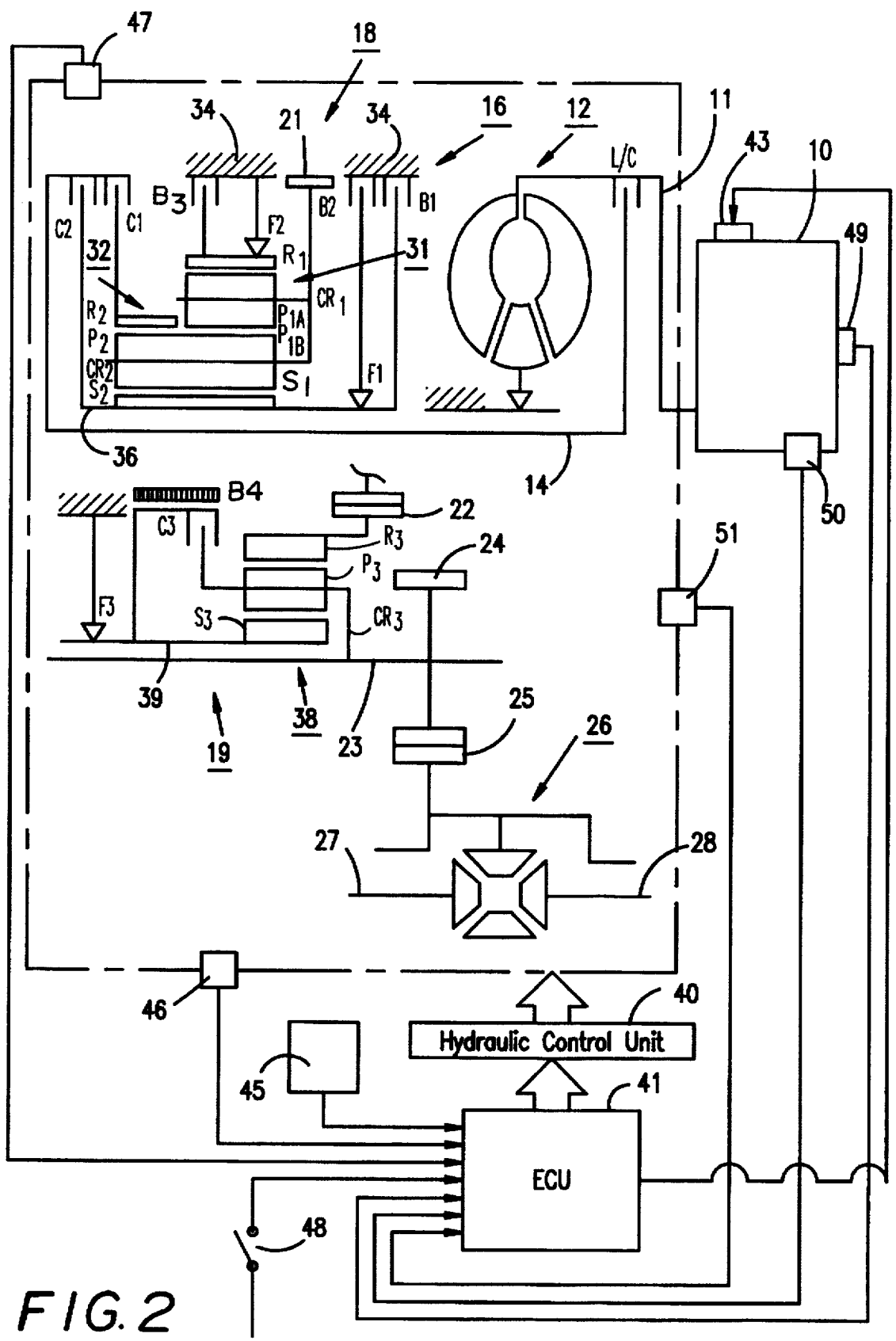
FIG. 2 is a schematic diagram of the automatic transmission in the first embodiment of FIG. 1.

As shown in FIG. 2, the rotation generated by the engine 10 is transmitted through an engine output shaft 11 to the torque converter 12. This torque converter 12 transmits the rotation of the engine 10 to a converter output shaft 14 either through a fluid (or working oil) coupling or directly through a lockup clutch L/C. The lockup clutch L/C is applied (engaged) when the vehicle speed exceeds a predetermined value.

The output shaft 14 is connected to the speed change unit 16 which has four forward gear ranges and one reverse gear range. This speed change unit 16 includes a main transmission 18 providing three forward speeds and one reverse speed and includes an under-drive auxiliary transmission 19. The rotation of the main transmission 18 is transmitted through a counter drive gear 21 and a counter driven gear 22 to the auxiliary transmission 19. The rotation of the output shaft 23 of the auxiliary transmission 19 is transmitted through an output gear 24 and a ring gear 25 to a differential mechanism 26.

The differential mechanism 26 transmits the rotation from the output gear 24 and the ring gear 25 to lefthand and righthand drive shafts 27 and 28 connected to the drive wheels (not shown).

The main transmission 18 is equipped with a first planetary gear unit 31 and a second planetary gear unit 32. The first clutch C1, a second clutch C2, a first brake B1, a second brake B2, a third brake B3 and one-way clutches F1 and F2 transmit the torque selectively between the individual elements of the first planetary gear unit 31 and the second planetary gear unit 32.

The first planetary gear unit 31 is composed of: a ring gear $R_1$ connected to a drive unit casing 34 through the third brake B3 and the one-way clutch F2 which are arranged in parallel with each other; a sun gear S1 formed on a sun gear shaft 36 fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The sun gear shaft 36 is connected through the second clutch C2 to the output shaft 14. The sun gear shaft 36 is further connected through the first brake B1 to the drive unit casing 34 and through the one-way clutch F1 and the second brake B2, as arranged in series, to the drive unit casing 34.

On the other hand, the second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$ and formed integrally with the pinion $P_{1B}$.

The counter drive gear 21 is made to mesh with the counter driven gear 22 arranged in the auxiliary transmission 19, to transmit the rotation, as has its speed changed by the main transmission 18, to the auxiliary transmission 19.

This auxiliary transmission 19 is equipped with a third planetary gear unit 38 and with a third clutch C3, a fourth brake B4 and a one-way clutch F3 for transmitting the torque selectively between the individual elements of the third planetary gear unit 38.

The third planetary gear unit 38 is composed of: a ring gear $R_3$ connected to the counter driven gear 22; a sun gear $S_3$ formed on a sun gear shaft 39 rotatably fitted on the output shaft 23; a carrier $CR_3$ fixed on the output shaft 23; and a pinion $P_3$ meshing between the ring gear $R_3$ and the sun gear $S_3$ and rotatably supported by the carrier $CR_3$.

In operation of the automatic transmission, as shown in FIG. 3: reference characters S1 designate a first solenoid valve; characters S2 designate a second solenoid valve; characters S3 designate a third solenoid valve; characters C1 designate the first brake; characters C2 designate the second clutch; characters C3 designate the third clutch; characters B1 designate the first brake; characters B2 designate the second brake; characters B3 designate the third brake; characters B4 designate the fourth brake; and characters F1 to F3 designate the one-way clutches. The letter R designates a reverse running range; letter N designates a neutral range; letter D designates a drive range; characters 1ST designate a first or low speed gear stage; characters 2ND designate a second speed gear stage; characters 3RD designate a third speed gear stage; and characters 4TH designate a fourth speed gear stage.

Symbol o indicates that a first solenoid signal S1, a second solenoid signal S2 and a third solenoid signal S3 for opening/closing the first solenoid valve S1, the second solenoid valve S2 and the third solenoid valve S3 respectively are ON, that the first clutch C1, the second clutch C2, the third clutch C3, the first brake B1, the second brake B2, the third brake B3 and the fourth brake B4 are applied (engaged), and that the one-way clutches F1 to F3 are locked. On the other hand, symbol X indicates that the first solenoid signal S1, the second solenoid signal S2 and the third solenoid signal S3 for opening/closing the first solenoid valve S1, the second solenoid valve S2 and the third solenoid valve S3 are OFF, that the first clutch C1, the second clutch C2, the third clutch C3, the first brake B1, the second brake B2, the third brake B3 and the fourth brake B4 are released, and that the one-way clutches F1 to F3 are free.

Symbol Δ indicates the state in which the component is turned ON/OFF at the neutral control time, and symbol (o) indicates that the third brake B3 is applied at the engine brake time.

At the 1st speed in the D-range, the first clutch C1 and the fourth brake B4 are applied to lock the one-way clutches F2 and F3. Then, the rotation of the output shaft 14 is transmitted through the first clutch C1 to the ring gear $R_2$. In this state, the rotation of the ring gear $R_1$ is blocked by the one-way clutch F2 so that the rotation of the carrier $CR_2$ is drastically decelerated and transmitted to the counter driven gear 21 while rotating the sun gear $S_2$ idly.

The rotation, as transmitted from the counterdrive gear 21 to the counter driven gear 22, is transmitted to the ring gear $R_3$. However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. Then, the rotation of the output shaft 14 is transmitted through the first clutch C1 to the ring gear $R_2$. The rotation of this ring gear $R_2$ is decelerated and transmitted to the carrier $CR_2$, because the rotation of the sun gear $S_2$ is blocked by the second brake B2 and the one-way clutch F1. The rotation of the carrier $CR_2$ is transmitted to the counter drive gear 21 while rotating the ring gear $R_1$ idly.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is decelerated and transmitted to the output shaft 23.

Next, at the 3rd speed in the D-range, the first clutch C1, the third clutch-C3, the first brake B1 and the second brake B2 are applied to lock the one-way clutch F1. Then, the rotation of the output shaft 14 is transmitted through the first clutch C1 to the ring gear $R_2$. The rotation of this ring gear $R_2$ is decelerated and transmitted to the carrier $CR_2$ because the rotation of the sun gear $S_2$ is blocked by the second brake B2 and the one-way clutch F1. The rotation of the carrier $CR_2$ is transmitted to the counter drive gear 21 while rotating the ring gear $R_1$ idly.

The rotation, as transmitted from the counter drive gear 21 to the counter driven gear 22, is transmitted to the ring gear $R_3$. However, the relative rotation between the carrier $CR_3$ and the sun gear $S_3$ is blocked by the third clutch C3 so that the third planetary gear unit 38 comes into a direct-coupled state. As a result, the rotation of the counter driven gear 22 is transmitted unchanged to the output shaft 23.

Next, at the 4th speed in the D-range, the first clutch C1, the second clutch C2, the third clutch C3 and the second brake 132 are applied. Then, the rotation of the output shaft 14 is transmitted through the first clutch C1 to the ring gear $R_2$ and through the second clutch C2 to the sun gear $S_2$ to bring the first planetary gear unit 31 and the second planetary gear unit 32 into direct-coupled states. As a result, the rotation of the output shaft 11 is transmitted unchanged to the counter drive gear 21.

The rotation, as transmitted from the counter drive gear 21 to the counter driven gear 22, is transmitted to the ring gear $R_3$. However, the relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted unchanged to the output shaft 23.

The automatic transmission is provided with a hydraulic control unit 40 for establishing the individual gear stages by applying/releasing the first clutch C1, the second clutch C2, the third clutch C3, the first brake B1, the second brake B2, the third brake B3 and the fourth brake B4.

On the other hand, the engine 10 is provided with an engine control unit 43 so that the engine 10 can be controlled by the engine control unit 43.

The hydraulic control unit 40 and the engine control unit 43 are connected with the automatic transmission control system (ECU) 41 so that they are operated according to the control program of the automatic transmission control system 41.

With this automatic transmission control system 41, on the other hand, there are individually connected a neutral start switch 45, an oil temperature sensor 46, the RPM sensor 47, a brake switch 48, the engine RPM sensor 49, a throttle opening sensor 50 and a vehicle speed sensor 51.

The shift position of the lever (not shown), i.e., the selected range can be detected by the neutral start switch 45. The temperature of the oil in the hydraulic control unit 40 can be detected by the oil temperature sensor 46. The RPM of the output shaft 14 (as will be called the "clutch input side RPM") $N_{C1}$, as located at the input side of the first clutch C1, can be detected by the RPM sensor 47. The clutch input side RPM $N_{C1}$ is detected as the output RPM of the torque converter 12.

Furthermore, whether or not the brake pedal (not shown) is depressed can be detected by the brake switch 48. An engine RPM $N_E$ can be detected by the engine RPM sensor 49. The throttle opening θ can be detected by the throttle opening sensor 50. The vehicle speed can be detected by the vehicle speed sensor 51. The engine RPM $N_E$ is detected as the input RPM of the torque converter 12.

Figure 4:
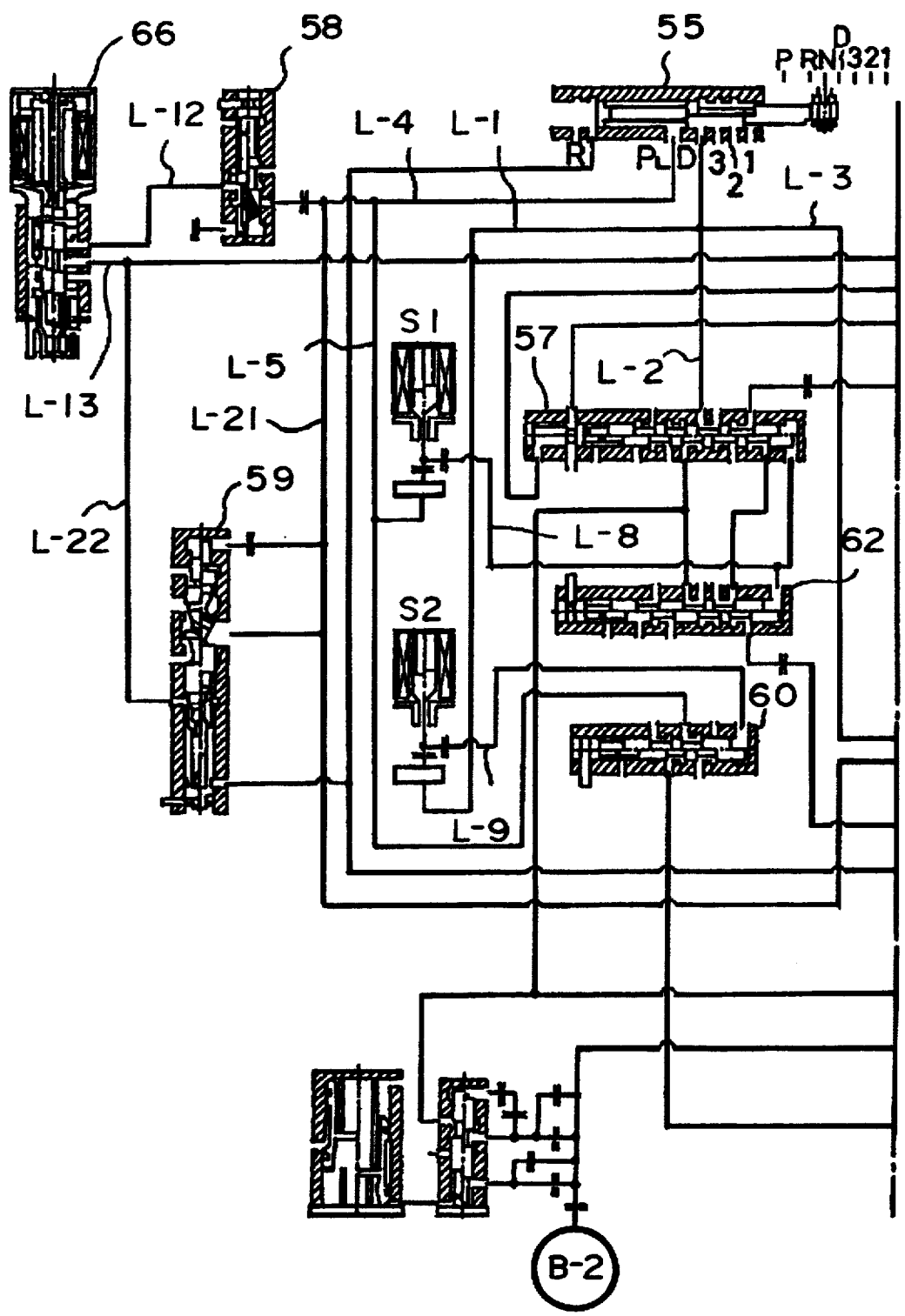
FIG. 4 is a diagram showing a first portion of a hydraulic control unit in the first embodiment of FIGS. 1 and 2.
Figure 5:
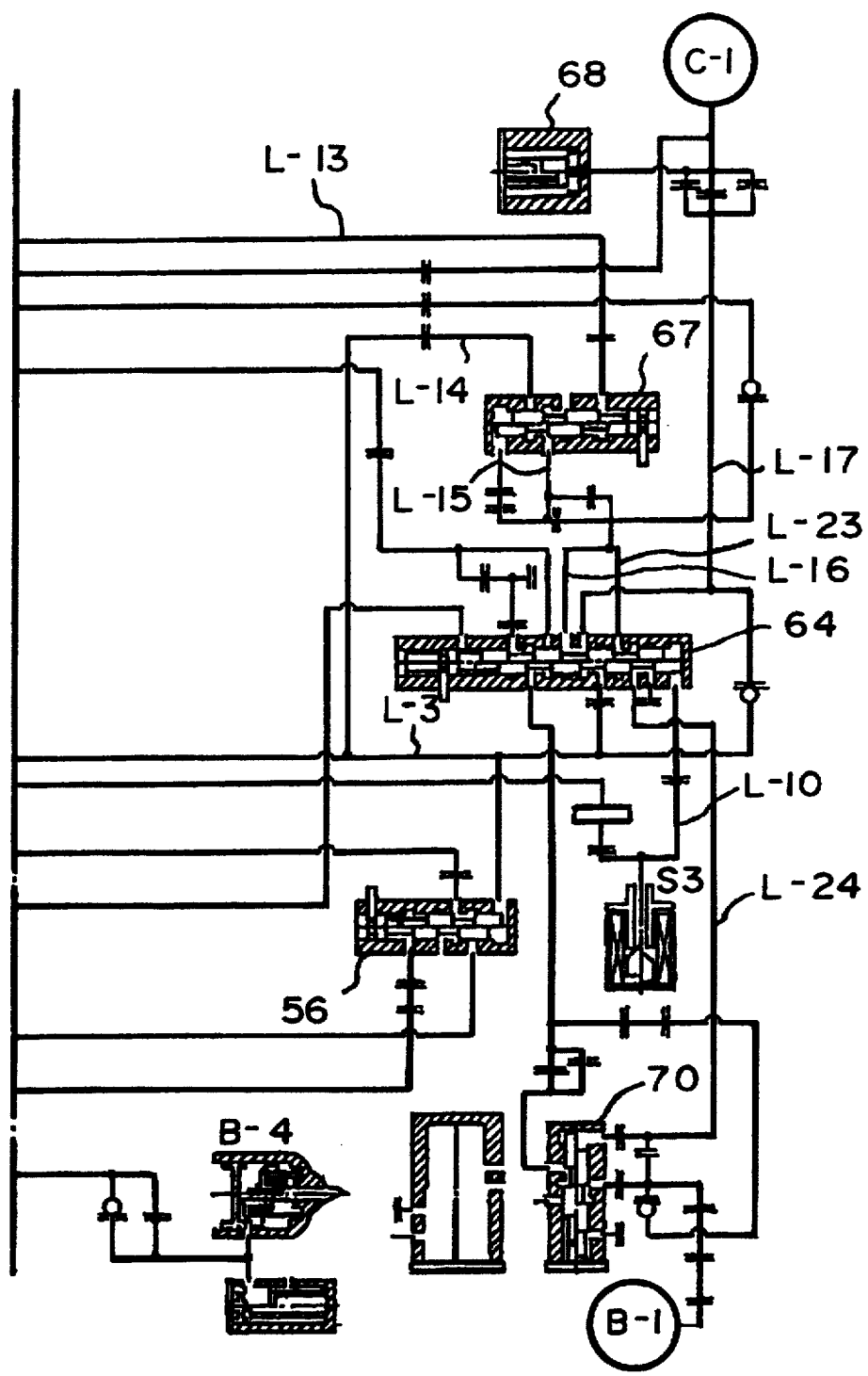
FIG. 5 is a diagram showing a second portion of the hydraulic control unit of the embodiment of FIGS. 1 and 2.

The hydraulic control unit 40 is illustrated in FIGS. 4 and 5 wherein a primary valve 59 regulates the oil pressure coming from an oil pressure source (not shown) and outputs it as a line pressure to an oil line L-21. A manual valve 55 is provided with ports 1, 2, 3, D, $P_L$ and R so that the line pressure, as fed from the primary valve 59 through oil lines L-21 and L4 to the port $P_L$, is established as 1-range, 2-range, 3-range, D-range and R-range pressures at the respective ports 1, 2, 3, D and R by manipulating the shift lever.

When this shift lever is placed in the D-range position, the D-range pressure oil, as established in the port D, is fed through an oil line L-1 to the second solenoid valve S2, through an oil line L-2 to a 12 shift valve 57, and through an oil line L-3 to a B-1 sequence valve 56. On the other hand, the line pressure from the primary valve 59 is fed through the oil line L-21 to the third solenoid valve S3.

The line pressure from the oil line L21 is fed through the oil line L-4 to a solenoid modulator valve 58 and through an oil line L-5 to the first solenoid valve S1 and a 2-3 shift valve 60.

The first solenoid signal S1, the second solenoid signal S2 and the third solenoid signal S3 for opening/closing the first solenoid valve S1, the second solenoid valve S2 and the third solenoid valve S3 are turned ON/OFF in response to a change-over signal coming from the automatic transmission control system 41 (FIG. 2). As a result, the first solenoid valve S1 feeds a signal oil pressure through an oil line L-8 to the 1-2 shift valve 57 and a 3-4 shift valve 62. The second solenoid valve S2 feeds a signal oil pressure through an oil line L-9 to the 2-3 shift valve 60. The third solenoid valve S3 feeds a change-over signal oil pressure through an oil line L-10 to a neutral relay valve 64.

The 1-2 shift valve 57 takes its upper half position (as located above the spool) at the 1st speed and its lower half position (as located below the spool) at the 2nd to 4th speeds. The 2-3 shift valve 60 takes its lower half position at the 1st and 2nd speeds and its upper half position at the 3rd and 4th speeds. The 3-4 shift valve 62 takes its upper half position at the 1st and 4th speeds and its lower half position at the 2nd and 3rd speeds. The neutral relay valve 64 takes its upper half position at the neutral control time and its lower half position at the 1st to 4th speeds.

The solenoid modulator valve 58 is connected through an oil line L-12 to a linear solenoid valve 66, which is connected through an oil line L-13 to a C-1 control valve 67. The linear solenoid valve 66 is further connected through an oil line L-22 to the primary valve 59.

The linear solenoid valve 66 is controlled by a control signal received from the automatic transmission control system 411 to feed a throttle pressure $P_{TH}$ as the control signal oil pressure through the oil line L-13 to the C-1 control valve 67. This C-1 control valve 67 is fed with the D-range pressure through the oil lines L-3 and L-14 so that it controls the fed D-range pressure to the control oil pressure (as will be called the "C-1 oil pressure") $P_{C1}$ of the hydraulic servo C-1, as corresponding to the throttle pressure $P_{TH}$ coming from the linear solenoid valve 66, and feeds it to an oil line L-15.

In the B-1 sequence valve 56, a spring is arranged at the lefthand end of the drawing whereas a control oil chamber is formed at the righthand end of the drawing, and the spring applies a spring load to the spool. The B-1 sequence valve 56 is caused at the 1st speed to take its lower half position in response to the D-range pressure it receives at the control oil chamber through the oil line L-3. When the oil pressure is fed at the 2nd speed to a hydraulic servo B-2 so that it rises, the B-1 sequence valve 56 receives the sequence pressure from the hydraulic servo B-2 so that it is caused to take its upper half position by having its spool pushed rightward by the sequence pressure and the spring load.

As a result, the oil pressure from the 1–2 shift valve 57 is fed through the B-1 sequence valve 56 to the 3–4 shift valve 62 and further through the 1–2 shift valve 57 and the neutral relay valve 64 to the hydraulic servo B-1. Thus, the oil pressure is fed to the hydraulic servo B-1 in response to the rise of the oil pressure in the hydraulic servo B-2.

The neutral relay valve 64 takes its upper half position at the neutral control time. In this neutral control, therefore, the C-1 oil pressure $P_{C1}$, as established in the oil line L-15, is fed through an oil line L-16, the neutral relay valve 64 and an oil line L-17 to the-hydraulic servo C-1. The oil under the C-1 oil pressure $P_{C1}$ is fed through oil lines L-23 and L-24 to a B-1 control valve 70.

At the 1st to 4th speeds, the neutral relay valve 64 takes its lower half position. At the 1st to 4th speeds, therefore, the oil under the D-range pressure is fed through the oil line L-3, the neutral relay valve 64 and the oil line L-17 to the hydraulic servo C-1. In the neutral control, the neutral relay valve 64 is switched to its upper half position to connect the oil line L-16 and the oil line L-17.

Numeral 68 designates a damper valve which is arranged in the oil line L-17 for smoothing the release of the oil from the hydraulic servo C-1, and characters B-4 designate a hydraulic servo of the fourth brake B4 (FIG. 3).

The neutral relay valve 64, the linear solenoid valve 66, the C-1 control valve 67 and the hydraulic servo C-1 form the hydraulic control means 100 (FIG. 1).

Figure 6:
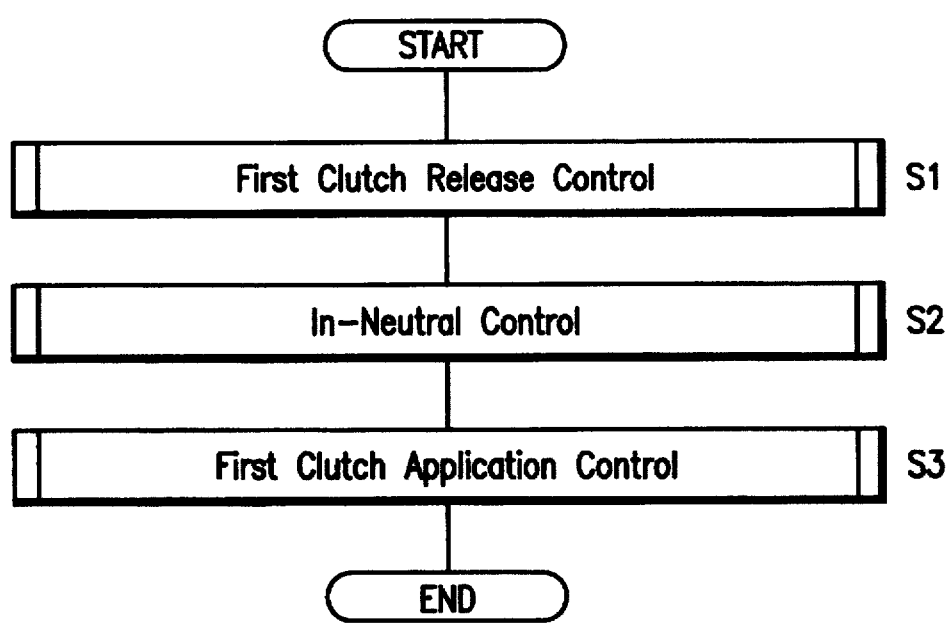
FIG. 6 is a flow chart of a neutral control routine in the first embodiment of FIGS. 1 and 2.
Figure 7:
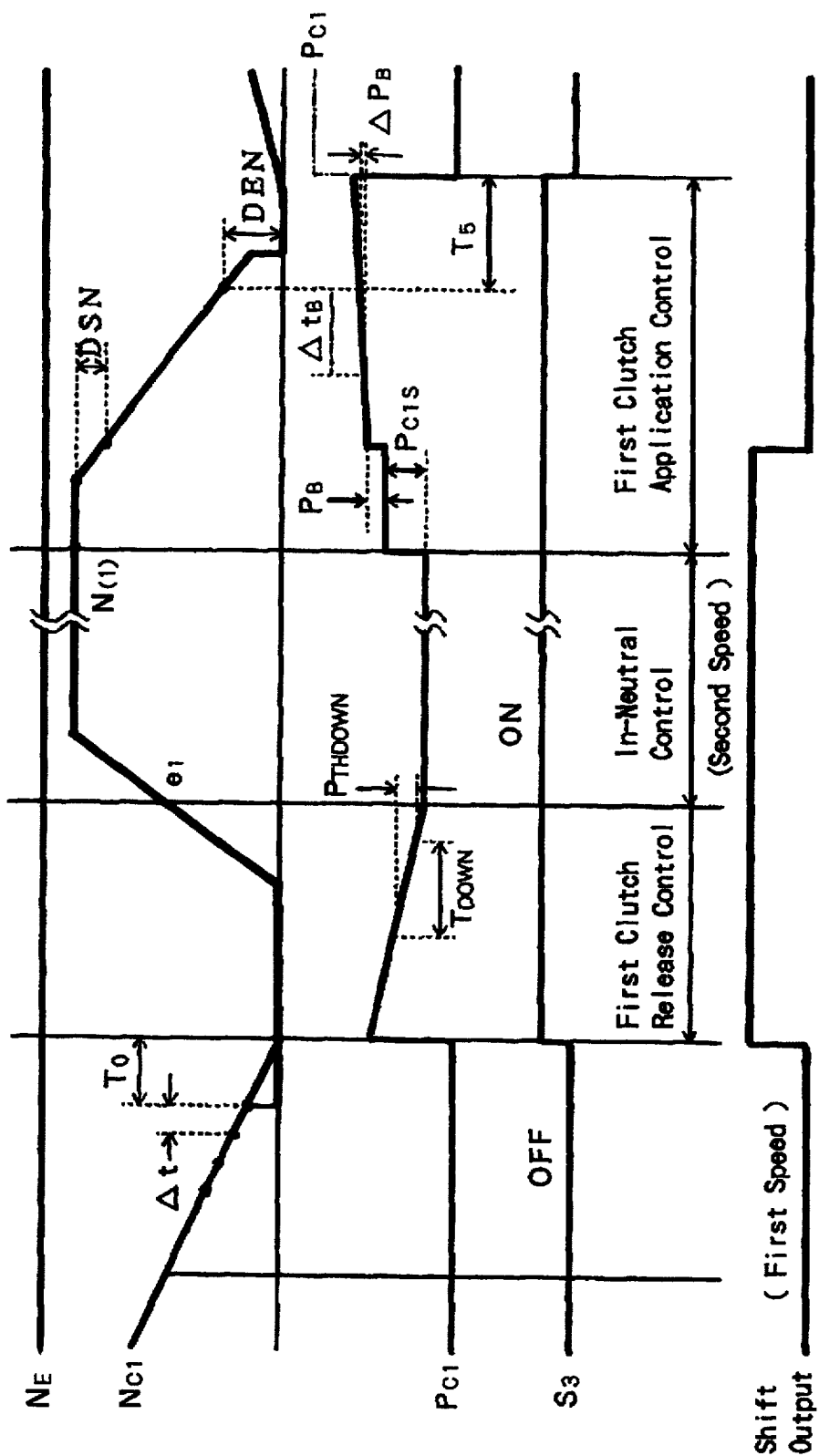
FIG. 7 is a time chart of operation of the automatic transmission control system in the first embodiment of FIGS. 1–6.

The neutral control is illustrated by the flow chart of FIG. 6 and the time chart of FIG. 7.

Step S1: The first clutch release control is executed. At this step, a zero vehicle speed is estimated to output the 2nd speed shift output at a set timing so that the applications of the second brake B2 (FIG. 2) and the first brake B1 are started to perform the hill-hold control thereby to sweep down the C-1 oil pressure $P_{C1}$ at a set timing.

For this, the engine RPM $N_E$ corresponding to the input torque is determined to output the C-1 oil pressure $P_{C1}$ corresponding to the engine RPM $N_E$, and the C-1 oil pressure $P_{C1}$ is gradually lowered.

The input torque can be detected not only from the engine RPM $N_E$ but also indirectly from the engine air suction or the fuel injection rate. The input torque of the speed change unit 16 can also be directly detected by a torque sensor (not shown). In this case, the torque sensor is attached to the output shaft 14 of the torque converter 12.

Step S2: An in-neutral control is executed to establish the neutral control state. At this step, stabilization of the engine RPM $N_E$ and the clutch input side RPM $N_{C1}$ are awaited. After stabilization, the C-1 oil pressure $P_{C1}$ is raised or lowered by set pressures according to the two RPMs.

Step S3: A first clutch application control is executed. At this step, the C-1 oil pressure $P_{C1}$ is raised by set pressures which is set on the basis of the throttle opening θ and the engine RPM $N_E$ until an end of movement of the piston in the piston stroke of the hydraulic servo C-1 (FIG. 5). After the end of the movement of the piston in the piston stroke of the hydraulic servo C-1, the C-1 oil pressure $P_{C1}$ is raised by set pressures to prevent the application shock.

Figure 8:
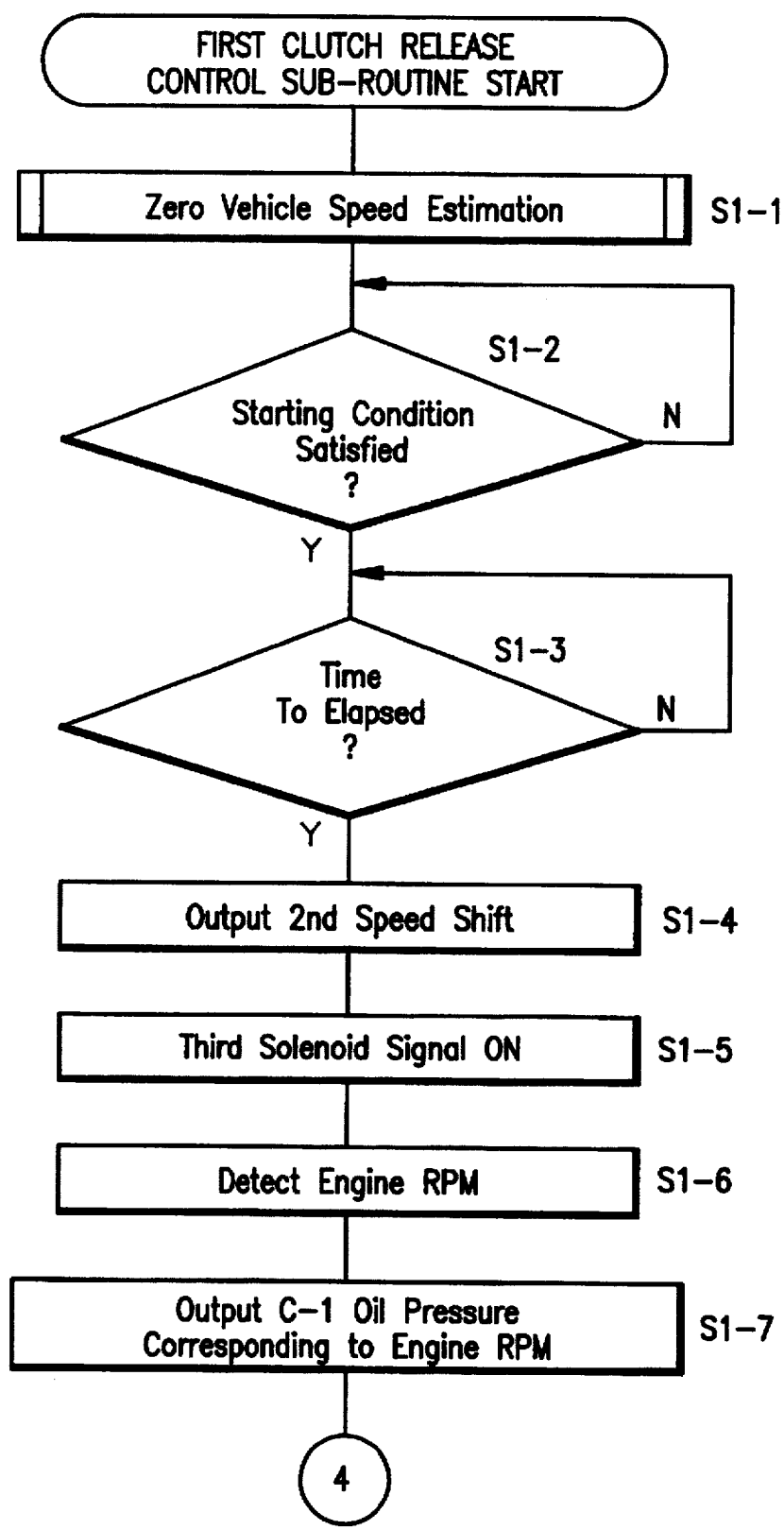
FIG. 8 is a flow chart of a first portion of a first clutch release control routine in the first embodiment.
Figure 9:
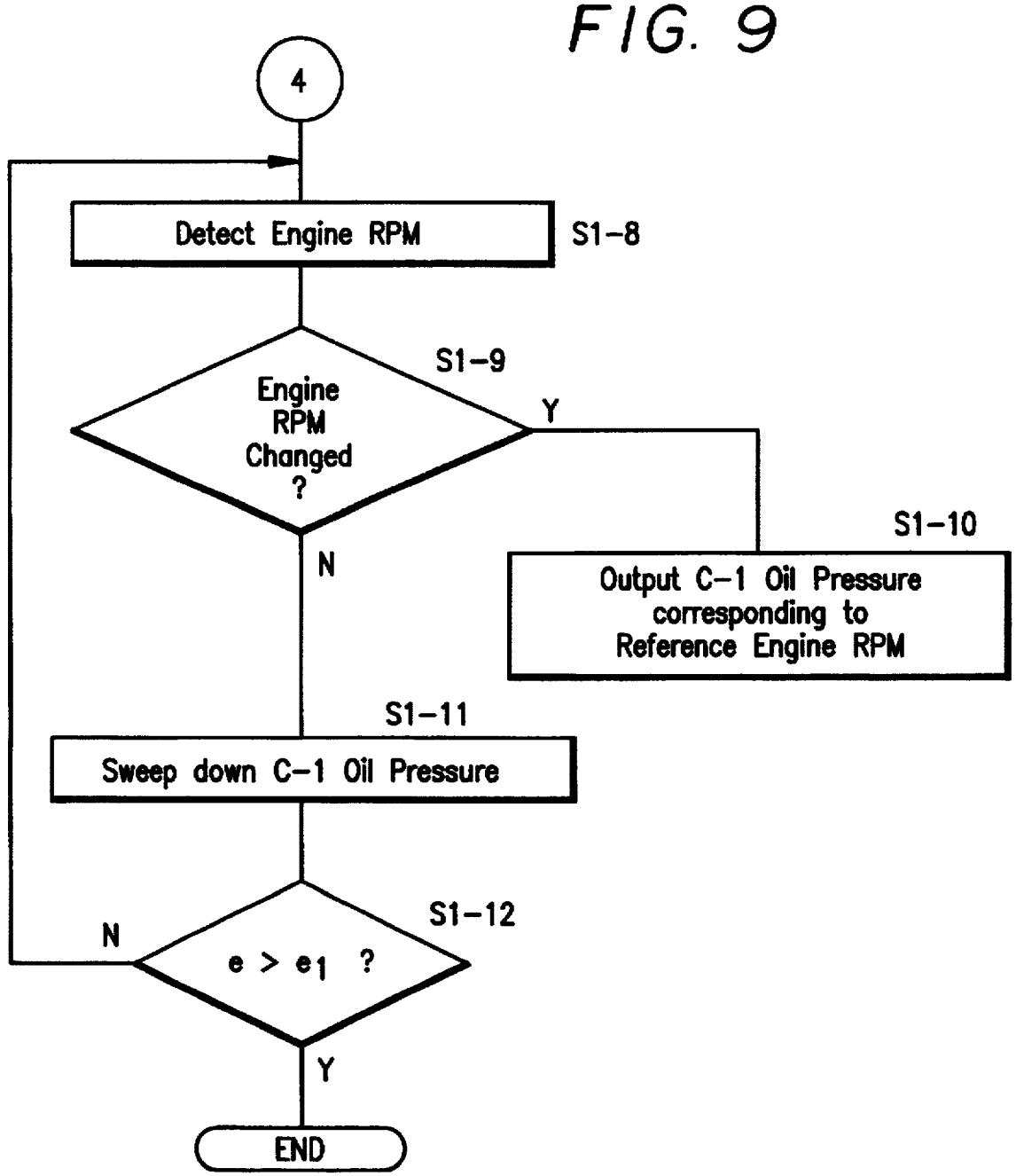
FIG. 9 is a flow chart of a second portion of the first clutch release control routine in the first embodiment.
Figure 10:
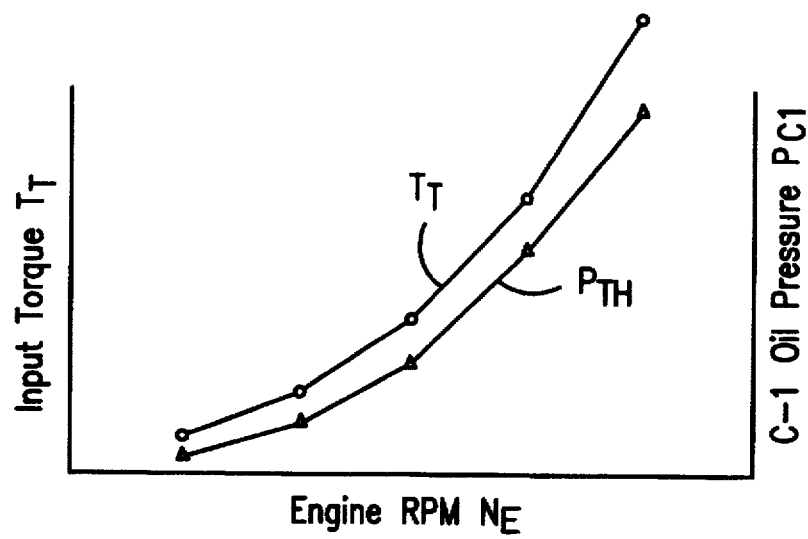
FIG. 10 is a graph showing the relationship between engine RPM, input torque and throttle pressure in the first embodiment.

The first clutch release control sub-routine at Step S1 of FIG. 6 is illustrated in FIGS. 8 to 10. In FIG. 10, the abscissa indicates the engine RPM $N_E$, and the ordinate indicates the intake torque $T_T$ (=t·C·$N_E^2$) and the C-1 oil pressure $P_{C1}$.

Step S1-1: The zero vehicle speed is estimated on the basis of the variation of the clutch input side RPM $N_{C1}$.

Step S1-2: The stop state detecting means 101 (FIG. 1) awaits satisfaction of the starting condition for the neutral control. At the same time, the timing of the not-shown first timer is started.

In this case, it is decided that the starting condition is satisfied, if all the following individual conditions are satisfied: that the clutch input side RPM $N_{C1}$ is substantially zero; that the accelerator pedal is released such as by determining from sensor 50 (FIG. 2) that the throttle opening θ is less than a predetermined value; that the oil temperature detected by the oil temperature sensor 46 (FIG. 2) is higher than a predetermined value; and that the brake pedal is depressed such as indicated by the brake switch 48 being ON. Whether or not the clutch input side RPM $N_{C1}$ is substantially zero is decided depending upon whether or not the detection limit of the RPM sensor 47 is detected. In the present embodiment, it is decided that the detection limit is detected at an actual vehicle speed of a set value (2 km/h).

Step S1-3: The stop state detecting means 101 awaits lapse of a time period $T_0$ timed by the first timer, and the sub-routine advances to Step S1-4 if the time period $T_0$ elapses. Here, the time period $T_0$ is calculated by the zero vehicle speed estimation step, and the zero vehicle speed is estimated when the time period $T_0$ elapses.

Step S1-4: the 2nd-speed shift output for starting the hill-hold control is generated, and the first solenoid signal S1 for opening/closing the first solenoid valve S1 (FIG. 4) is turned ON to feed the oil pressure to the hydraulic servo B-2 thereby to apply the second brake B2. As the oil pressure in the hydraulic servo B-2 rises, the sequence pressure in the hydraulic servo B-2 is fed to the B-1 sequence valve 56 (FIG. 5) to feed the oil pressure to the hydraulic servo B-1 thereby to apply the first brake B1.

Thus, the hill-hold control is executed to establish the 2nd-speed gear stage in the speed change unit 16 so that the first clutch C1, the first brake B1, the second brake B2 and the fourth brake B4 are applied to lock the one-way clutches F1 and F3. If the vehicle runs backward in this state, a backward rotation is transmitted to the output shaft 23 of the auxiliary transmission 19 to rotate the ring gear $R_1$ forward. However, this forward rotation is blocked by the one-way clutch F2 so that the vehicle does not run backward.

Step S1-5: The third solenoid signal S3 is turned ON to switch the neutral relay valve 64 to the upper half position thereby to bring the C-1 oil pressure $P_{C1}$ into a controllable state.

Step S1-6: As shown in FIG. 10, the engine RPM $N_E$ corresponding to the input torque $T_T$ is detected to set the value of the engine RPM $N_E$ to a reference engine $RPM_{Em}$.

Step S1-7: The C-1 oil pressure $P_{C1}$ immediately before the first clutch C1 is released, as determined from FIG. 10 according to the engine RPM $N_E$, is established and output.

Step S1-8: The engine RPM $N_E$ corresponding to the input torque $T_T$ is detected again.

Step S1-9: The engine RPM $N_E$ is compared with the reference engine RPM $N_{Em}$ to decide whether or not it has changed. The sub-routine advances to Step S1-10, if the answer is YES, but to Step S1-11 if NOT.

Step S1-10: The value of the engine RPM $N_E$ when it is decided at Step S1-9 that the engine RPM $N_E$ has changed from the reference engine RPM $N_{Em}$ is set in the reference engine RPM $N_{Em}$, and the C-1 oil pressure $P_{C1}$ corresponding to the new reference engine RPM $N_{Em}$ is established and output.

Step S1-11: The C-1 oil pressure $P_{C1}$ is lowered (or swept down) by set pressures $P_{THDOWN}$ for every lapse of a set time period $T_{DOWN}$ as expressed by the following formula:

$$P_{TH} = P_{TH} - P_{THDOWN}.$$

Step S1-12: After the establishment of the released state of the first clutch C1, the pressure reduction of Step S1-11 is continued till a speed ratio e (=$N_{C1}/N_E$) exceeds a constant $e_1$. When the speed ratio e exceeds the constant $e_1$, the pressure reduction of Step S1-11 is stopped and ended. If the speed ratio e fails to exceed the constant $e_1$, the sub-routine returns to Step S1-8. The constant $e_1$ is set to 0.75, for example, by considering the delay of the change in the clutch input side RPM $N_{C1}$ for the operation of the oil pressure for releasing the first clutch C1. The speed ratio e may be substituted by the clutch input side RPM $N_{C1}$.

The applied (engaged) state of the first clutch C1 is detected by deciding whether or not the difference (as will be called the "rotational difference") ΔN between the engine RPM $N_E$ or the input RPM of the torque converter 12 and the clutch input side RPM $N_{C1}$ or the output RPM has changed. The rotational difference ΔN does not change no matter whether the first clutch C1 might be completely applied or released. This makes it difficult to discriminate the state, in which the first clutch C1 is completely applied, and the state in which the first clutch C1 is released.

By awaiting the excess of the speed ratio over the constant $e_1$, therefore, it is possible to reliably establish the state immediately before the application of the first clutch C1 is started. The rotational difference ΔN is calculated by the calculation means 102 in the automatic transmission control system 41.

Figure 11:
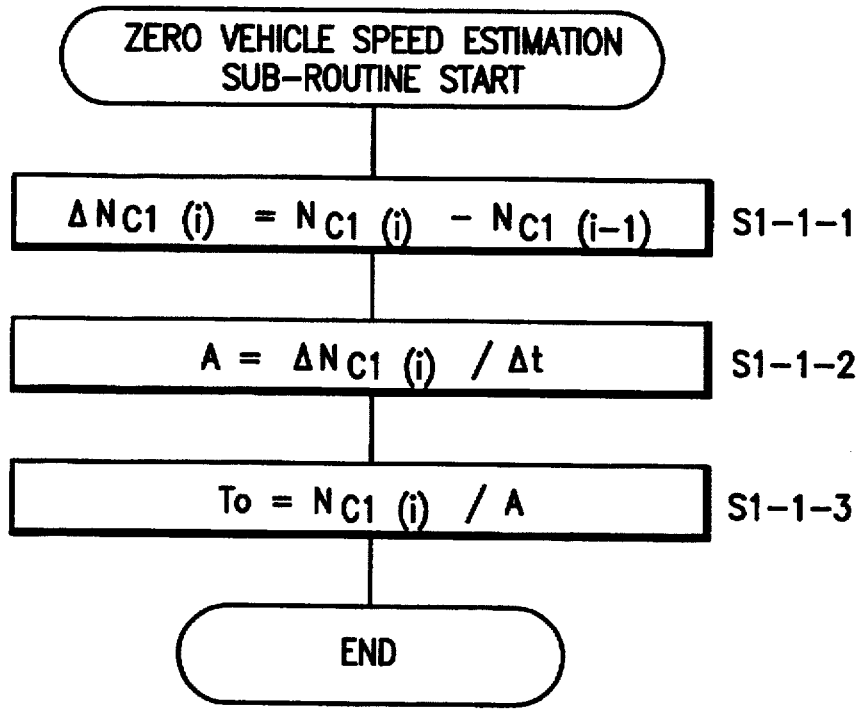
FIG. 11 is a flow chart of a zero vehicle speed estimating routine in the first embodiment.

The sub-routine of the zero vehicle speed estimation at Step S1-1 of FIG. 8 is illustrated in the flow chart of FIG. 11.

Step S1-1-1: An RPM difference $\Delta N_{C1(i)}$, is calculated by subtracting a previous clutch input side RPM $N_{C1(i-1)}$ from the present clutch input side RPM $N_{C1(i)}$. The readings of RPM $N_{C1(i)}$ are taken at time every periods Δt as set with the clock in the automatic transmission control system 41 (FIG. 2).

Step S1-1-2: A deceleration A of the vehicle is calculated by dividing the RPM difference $\Delta N_{C1(i)}$, by the time period Δt.

Step S1-1-3: The time period $T_0$ till the vehicle stop state is calculated by dividing the present clutch input side RPM $N_{C1(i)}$, by the deceleration A.

Figure 12:
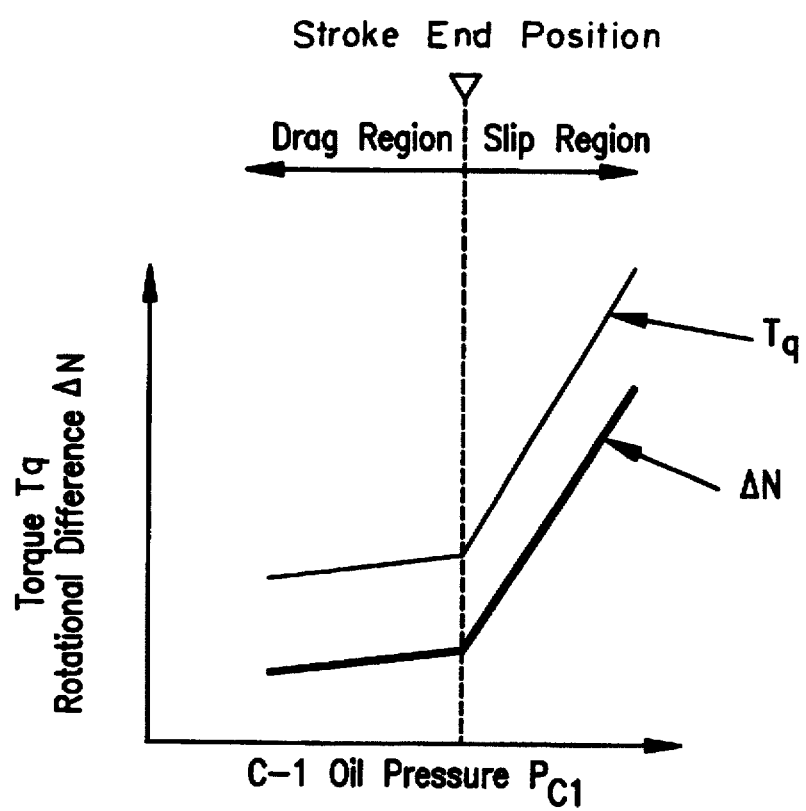
FIG. 12 is a graph illustrating the state of a clutch in the first embodiment.
Figure 13:
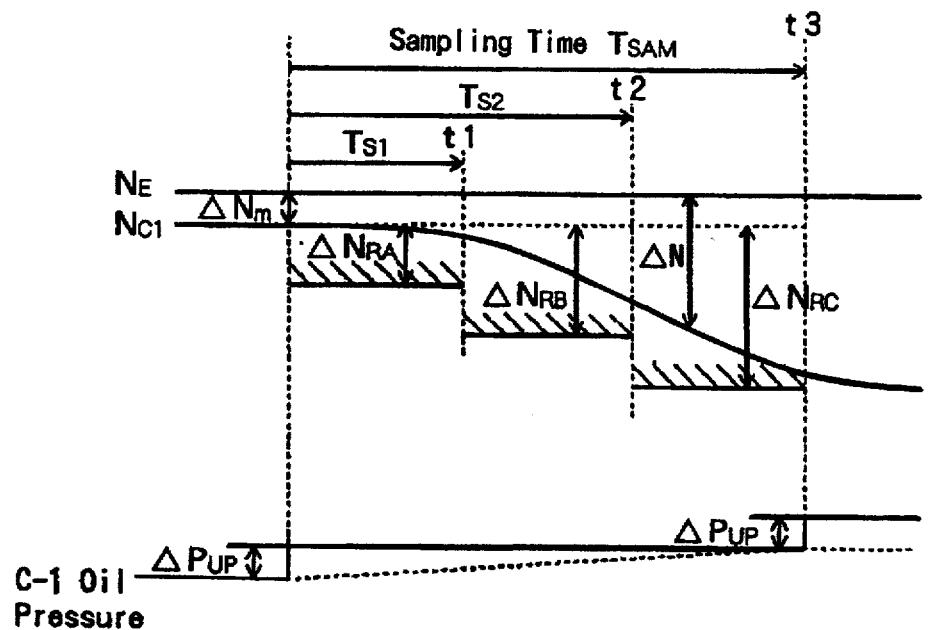
FIG. 13 is a time chart when the first clutch in the first embodiment is in a drag region.
Figure 14:
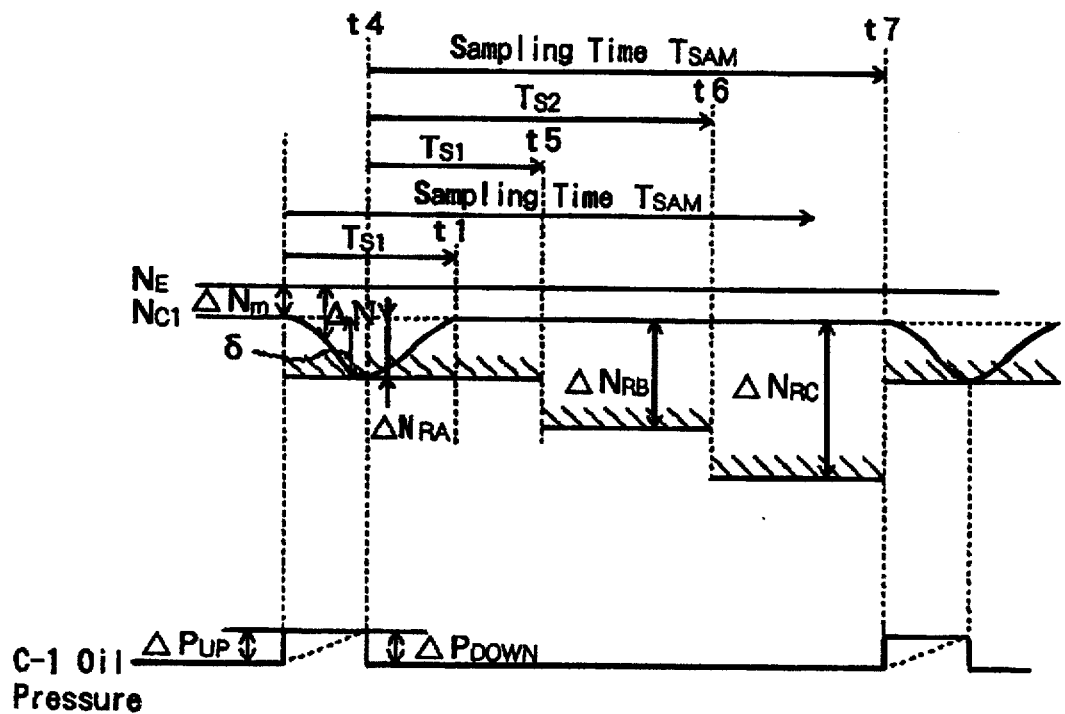
FIG. 14 is a time chart when the first clutch in the first embodiment is in a slip region.

The relationship between the applied/released states of the first clutch C1 and the rotational difference ΔN are illustrated in the diagram showing the state of the clutch in FIG. 12, the time chart of the drag region of clutch operation in FIG. 13 and the time chart of the slip region of clutch operation in FIG. 14. In FIG. 12, the abscissa indicates the C-1 oil pressure $P_{C1}$, and the ordinate indicates the rotational difference N and a torque $T_q$.

In FIG. 12, letters $T_q$ designate the torque to be transmitted from the engine 10 (FIG. 2) to the speed change unit 16 through the first clutch C1, and letters ΔN designate the rotational difference.

As the C-1 oil pressure $P_{C1}$ is gradually raised, the torque $T_q$ increases so that the torque converter 12 is accordingly loaded to increase the rotational difference ΔN.

By determining the rotational difference ΔN, therefore, it is possible to acquire the applied/released states of the first clutch C1, i.e., the torque transmission state.

When the application of the first clutch C1 is started from its completely released state by increasing the C-1 oil pressure $P_{C1}$, the piston of the hydraulic servo C-1 reaches the position (as will be called the "stroke end position") in which no stroke or free movement is left. When the C-1 oil pressure $P_{C1}$ is further raised, the first clutch C1 comes into the completely applied state. Hence, the region from the completely released state of the first clutch C1 to the arrival of the piston at the stroke end position will be termed as the drag region (or inoperative region) whereas the region from the arrival of the piston at the stroke end position to the completely applied state of the first clutch C1 will be termed as the slip region (or operative position).

In the drag region, the individual friction elements of the first clutch C1 are not in contact with each other. However, the torque $T_q$ is transmitted more or less through the first clutch C1 by the viscosity characteristics of the oil existing between the individual friction elements. The torque $T_q$ gradually increases, as the stroke of the piston advances to decrease the clearances (or gaps) between the opposing friction elements. In the drag region, the rotational difference ΔN increases in correspondence with the transmission of the torque $T_q$ and gradually increases as the torque $T_q$ increases.

In the slip region, on the other hand, the individual friction elements are in contact with each other so that frictional force increases the torque abruptly. The piston has already reached the stroke end position so that the oil into the hydraulic servo C-1 stops and the C-1 oil pressure rises abruptly. As a result, the frictional force is accordingly increased to further increase the torque $T_q$. As a result of the abrupt increase in the torque $T_q$, the rotational difference ΔN also abruptly increases.

There is a relationship between the amount (as will be called the "variation") δ of the rotational difference ΔN according to the change in the applied/released states of the first clutch C1 and the amount (as will be called the "rate of change") ρ of the rotational difference ΔN for the unit time period. If the rotational difference ΔN at the start of a sampling time $T_{SAM}$ is assumed to be a reference rotational difference $\Delta N_m$, the variation δ can be expressed by the difference between the rotational difference ΔN and the reference rotational difference $\Delta N_m$ at an arbitrary time.

If the C-1 oil pressure $P_{C1}$ to be fed to the hydraulic servo C-1 is to be raised, the rotational difference ΔN changes gradually in the drag region but abruptly in the slip region, as described above. As a result, the variation δ in the rotational difference ΔN is small in the drag region but large in the slip region. The rate of change ρ of the rotational difference ΔN is also low in the drag region but high in the slip region.

Noting that the rate of change ρ is different in the drag region and in the slip region, standard rates of change $\rho_1$ and $\rho_2$ in the drag region and in the slip region when the C-1 oil pressure $P_{C1}$ is raised are determined to suitably select an intermediate value between the two rates of change $\rho_1$ and $\rho_2$, and this intermediate value is set as a reference rate of change $\rho_{REF}$.

If this reference rate-of change $\rho_{REF}$ is thus set, the rate of change ρ while the first clutch C1 is in the drag region is always smaller than the reference rate of change $\rho_{REF}$ whereas the rate of change while the first clutch C1 is in the slip region is always larger than the reference rate of change $\rho_{REF}$.

By comparing the rate of change $\rho$ and the reference rate of change $\rho_{REF}$, therefore, it can be easily decided whether the first clutch C1 is in the drag region or in the slip region. Specifically, it can be decided, if the rate of change p is lower than the reference value $\rho_{REF}$, that the first clutch C1 is in the drag region and, if the rate of change $\rho_{REF}$ is higher than the reference value $\rho_{REF}$, that the first clutch C1 is in the slip region.

On the basis of this decision, it is possible to hold the clutch in a stroke-end non-engaged state immediately before the first clutch C1 is transferred from the drag region to the slip region.

When the in-neutral control is started, the release means 104 (FIG. 1) lowers the C-1 oil pressure $P_{C1}$ till at least the piston of the hydraulic servo C1 starts its retraction, so that the first clutch C1 is transferred from the slip region to the drag region.

Subsequently, the C-1 oil pressure $P_{C1}$ is so controlled that the rate of change $\rho$ of the rotational difference $\Delta N$ may not exceed the reference rate of change $\rho_{REF}$. Here in the present embodiment, when the rate of change $\rho$ and the reference rate of change $\rho_{REF}$ are to be compared, the comparison is not made directly between them but between the variation $\delta$ of the rotational difference $\Delta N$ for a set time period and the threshold value corresponding to the reference rate of change $\rho_{REF}$.

As shown in FIGS. 13 and 14, the aforementioned set time periods are exemplified by not only the sampling time period $T_{SAM}$ but also the time periods $T_{S1}$ and $T_{S2}$ which are obtained by dividing the sampling time period $T_{SAM}$ into three periods. If, in this case, the end times for the time periods $T_{S1}$ and $T_{S2}$ and the sampling time period $T_{SAM}$ (i.e., the elapse times after the start of application of the first clutch C1) are designated by t1 to t3, respectively, the individual threshold values $\Delta N_{Ri}$ (i=A, B and C) of the times t1 to t3 are expressed, as follows:

$$\Delta N_{RA} = \rho_{REF} \cdot T_{S1};$$

$$\Delta N_{RB} = \rho_{REF} \cdot T_{S2}; \text{ and}$$

$$\Delta N_{RC} = \rho_{REF} \cdot T_{SAM}.$$

Since the rate of change $\rho$ is low in the drag region, the threshold value $\Delta N_{R1}$ is not exceeded at the individual times t1 to t3, as seen from FIG. 13, even if the variation $\delta$ of the rotational difference $\Delta N$ increases as the time elapses. Therefore, the booster means 107 raises the C-1 oil pressure $P_{C1}$ by set pressures $\Delta P_{UP}$, as the sampling time period $T_{SAM}$ elapses, to transfer the applied/released states of the first clutch C1 to the slip region side. Thus, the piston of the hydraulic servo C-1 is brought closer to the stroke end position each time the sampling time period $T_{SAM}$ elapses.

When the piston reaches the stroke end position so that the first clutch C1 transfers to the slip region, the rate of change $\rho$ of the rotational difference $\Delta N$ exceeds the reference rate of change $\rho_{REF}$.

As shown in FIG. 14, for example, after the start of the application of the first clutch C1, the variation $\delta$ of the rotational difference $\Delta N$ exceeds a threshold value $N_{RA}$ at a time t4 before lapse of the time period $T_{S1}$. Therefore, the first pressure reducing means 108 decides that the first clutch C1 has transferred from the drag region to the slip region at the time t4 (i.e., at the instant when it is decided by the control program of the automatic transmission control system 41 that the variation $\delta$ has exceeded the threshold value $N_{RA}$), and lowers the C-1 oil pressure $P_{C1}$ by set pressures $\Delta P_{DOWN}$. At this time t4, the sampling time period $T_{SAM}$ is reset. If, in this case, the times after lapses of the time periods $T_{S1}$ and $T_{S2}$ and the sampling time $T_{SAM}$ from the time t4 are respectively designated by t5 to t7, the threshold value $\Delta N_{R1}$ is set at each of the timings t5 to t7.

Thus, the C-1 oil pressure $P_{C1}$ is lowered when the first clutch C1 transfers from the drag region to the slip region, and the first clutch C1 is always held in the stroke-end non-engaging state immediately before it transfers from the drag region to the slip region. The specific release state holding means 105 is constructed of the booster means 107 and the first pressure reducing means 108.

Since the individual friction elements of the first clutch C1 are thus barely brought into contact with each other, the torque $T_q$ to be transmitted from the engine 10 to the speed change unit 16 is greatly reduced. This makes it possible not only to improve the fuel economy but also to prevent any idle vibration in the vehicle. This also prevents heating of the individual friction elements of the first clutch C1 to increase the useful life or durability of the friction elements.

The piston of the hydraulic servo C-1 is held immediately ahead of the stroke end position. Hence, the loss stroke of the piston can be reduced to prevent any delay in the application, as might otherwise be caused by the loss stroke. As a result, it is possible to prevent the racing and application shock of the engine 10.

In the aforementioned drag region, the variation $\delta$ of the rotational difference $\Delta N$ does not exceed the threshold value $\Delta N_{R1}$ so that the booster means 107 raises the C-1 oil pressure $P_{C1}$ by the set pressure $\Delta P_{UP}$ each time of lapse of the sampling time $T_{SAM}$ to transfer the applied/released states of the first clutch C1 to the side of the slip region. However, the rise of the actual C-1 oil pressure $P_{C1}$ in the hydraulic servo C-1 is delayed by the viscous resistance or the like of the oil when the C-1 oil pressure $P_{C1}$ is raised by the set pressure $\Delta P_{UP}$.

In the previous decision, it may be apparently decided that the variation $\delta$ does not exceed the threshold value $\Delta N_{R1}$, if a delay is left in the rise of the C-1 oil pressure $P_{C1}$ at the instant of lapse of the sampling time $T_{SAM}$ after the C-1 oil pressure $P_{C1}$ has been raised by the set pressure $\Delta P_{UP}$. Since, in this case, the C-1 oil pressure $P_{C1}$ is raised more prematurely than necessary by the set pressure $\Delta P_{UP}$, the delays in the rise of the C-1 oil pressure $P_{C1}$ are accumulated to cause overshoot at the transfer from the drag region to the slip region.

The piston is retracted more than necessary if the sampling time $T_{SAM}$ is longer than necessary.

Therefore, this sampling time period $T_{SAM}$ is set to correspond to the necessary time period for the end of the actual change in the C-1 oil pressure $P_{C1}$ when the C-1 oil pressure $P_{C1}$ is raised by the set pressure $\Delta P_{UP}$, so that the C-1 oil pressure $P_{C1}$ may be raised at proper times.

Thus, the C-1 oil pressure $P_{C1}$ is raised by the set pressure $\Delta P_{UP}$ after the delay in its rise has disappeared. As a result, no accumulation of delays occurs and overshoot is prevented at the time when the first clutch C1 transfers from the drag region to the slip region.

The piston of the hydraulic servo C-1 can be prevented from retracting more than necessary.

Figure 15:
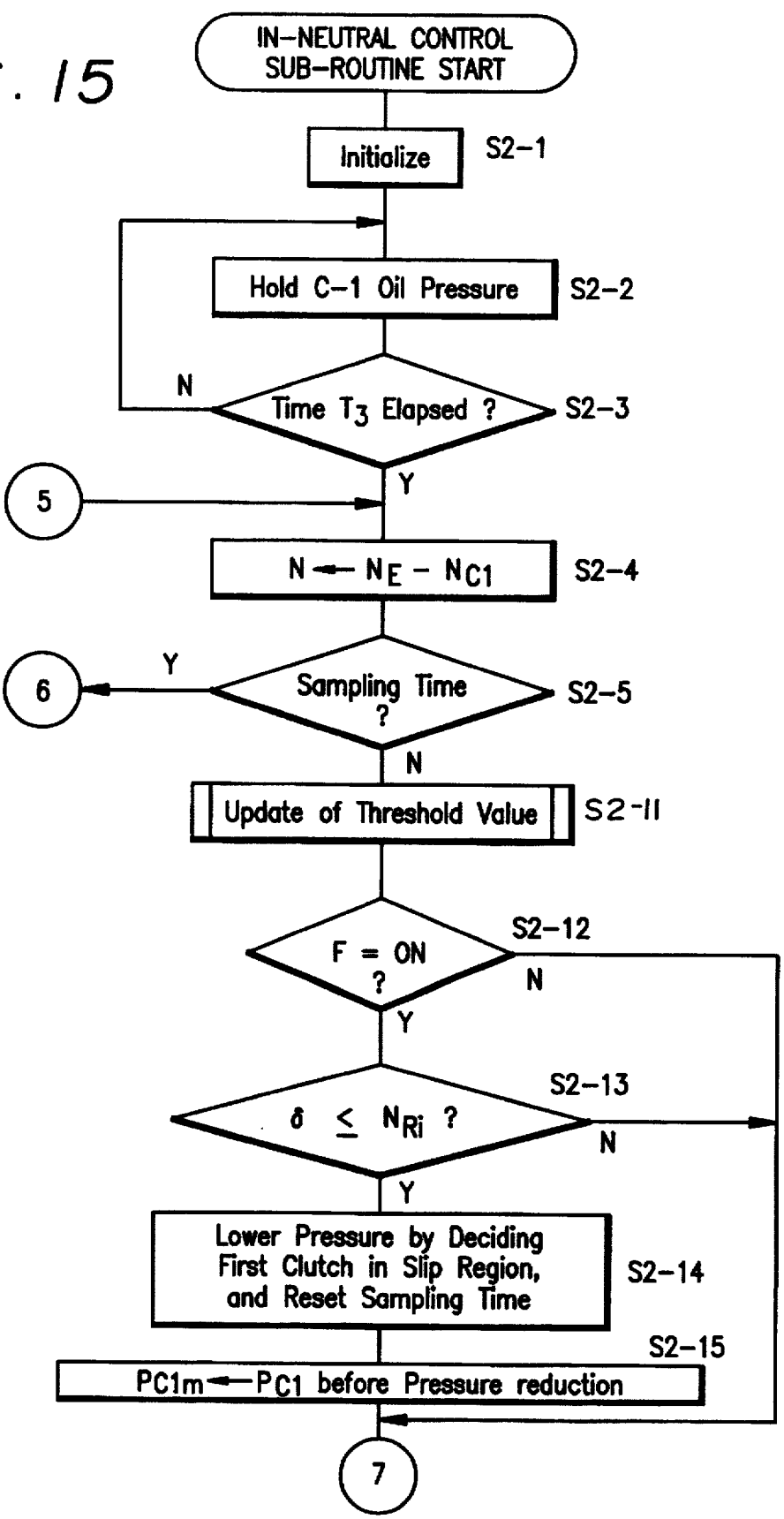
FIG. 15 is a flow chart of a first portion of an in-neutral control routine in the first embodiment.
Figure 16:
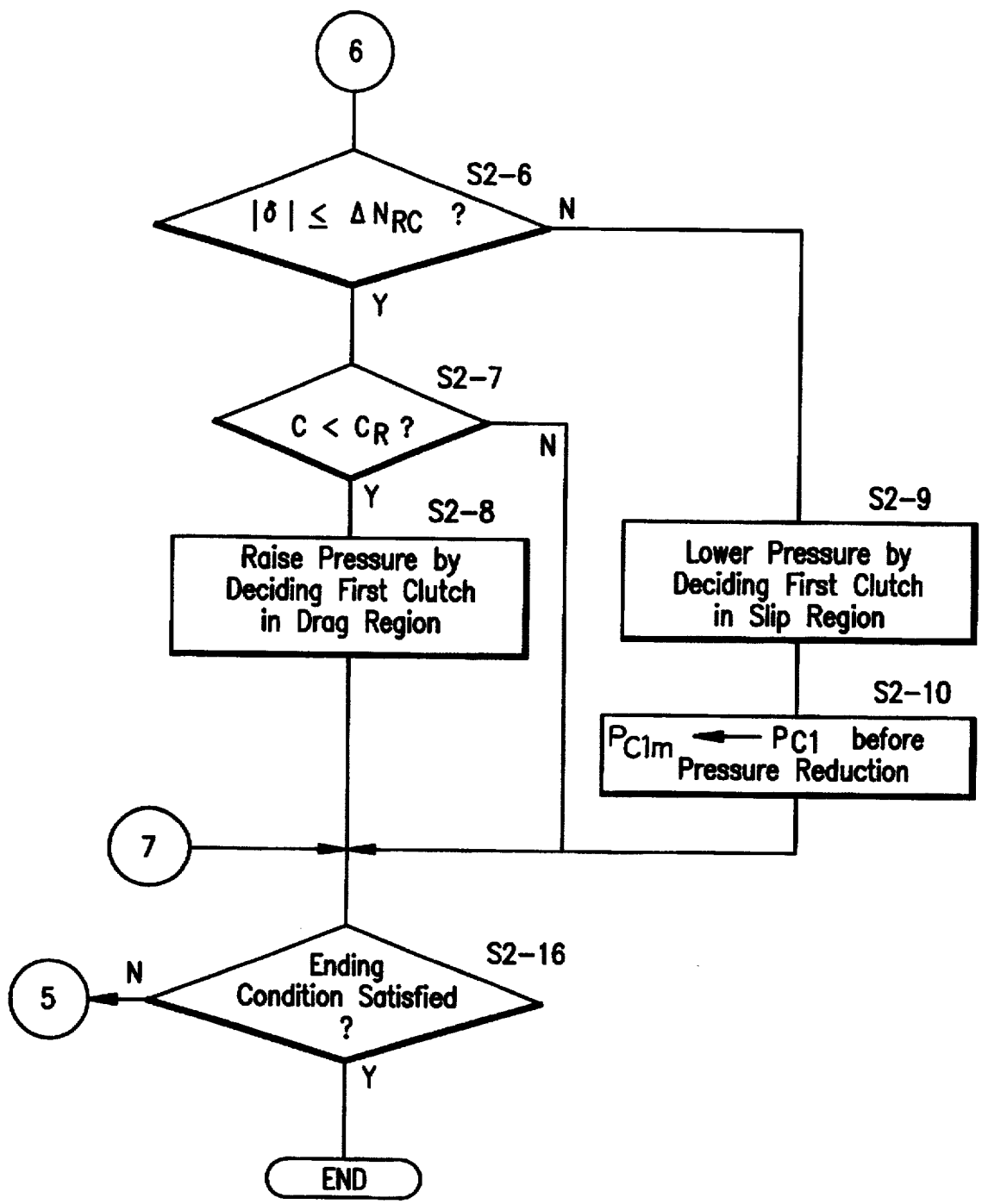
FIG. 16 is a flow chart of a second portion of the in-neutral control routine in the first embodiment.

The in-neutral control sub-routine of Step S2 of FIG. 6 is shown in the flow charts of the in-neutral control of FIGS. 15 and 16.

Step S2-1: The initial values of an oil pressure control flag F, a counted value C of the not-shown counter and the reference rotational difference $\Delta N_m$ are set, as follows:

F←OFF;

C←0;

and $\Delta N_m$←the value of the rotational difference $\Delta N(=N_E-N_{C1})$ at this time.

Steps S2-2 and S2-3: The C-1 oil pressure $P_{C1}$ is held at the final value in the first clutch releasing control routine. If the decision of whether or not the rotational difference $\Delta N$ has changed is started immediately after it has been confirmed that the first clutch C1 is released to the predetermined state, an erroneous decision may be made by the change in the rotational difference $\Delta N$, as caused by the pressure reduction in the first clutch release control routine. Therefore, the timing is performed by the second timer (not shown) to await the elapse of a time period T3, for which the C-1 oil pressure $P_{C1}$ is held. As a result, the decision on whether or not the rotational difference $\Delta N$ has changed is delayed so that the C-1 oil pressure $P_{C1}$ can be prevented from being controlled in an unstable state immediately after the first clutch C1 has been released. The routine advances to Step S2-4 when the time period T3 elapses.

Step S2-4: The rotational difference $\Delta N$ is calculated by subtracting the clutch input side RPM $N_{C1}$ from the engine RPM $N_E$.

Step S2-5: It is decided whether or not the predetermined time $T_{SAM}$ such as 1.0 seconds or 0.5 seconds has elapsed. The routine advances to Step S2-6, if the sampling time $T_{SAM}$ has elapsed, but to Step S2-11 if the sampling time $T_{SAM}$ has not elapsed.

Step S2-6: It is decided whether or not the difference between the rotational difference $\Delta N$ and the reference rotational difference $\Delta N_m$, i.e., the absolute value of the variation $\delta$ is below a threshold value $\Delta N_{RC}$. The routine advances to Step S2-7, if the absolute value of the variation $\delta$ is below the threshold value $\Delta N_{RC}$, but to Step S2-9 if the absolute value of the variation $\delta$ is over the threshold value $\Delta N_{RC}$.

Step S2-7: It is decided whether or not the counted value C is below a set value $C_R$. The routine advances to Step S2-8, if below the set value $C_R$, but to Step S2-16 if over the set value $C_R$.

Step S2-8: Since the absolute value of the variation $\delta$ is below the threshold value $\Delta N_{RC}$ even after the sampling time $T_{SAM}$ has elapsed, it is decided that the first clutch C1 is in the drag region, and the booster means 107 (FIG. 1) raises (or boosts) the C-1 oil pressure $P_{C1}$ by the set pressure $\Delta P_{UP}$ at the instant when the sampling time $T_{SAM}$ elapses:

$P_{C1}$←$P_{C1}+\Delta P_{UP}$.

The rotational difference $\Delta N$ is set to the reference rotational difference $\Delta N_m$ and the oil pressure control flag F is turned ON $\Delta N_m$←$\Delta N$;

and

F←ON.

Step S2-9: It can be decided that the first clutch C1 is transferring from the drag region to the slip region. Second pressure reducing means lowers (or reduces) the C-1 oil pressure $P_{C1}$ by the set pressure $\Delta P_{DOWN}$ at the instant when the sampling time $T_{SAM}$ elapses:

$P_{C1}$←$P_{C1}-\Delta P_{DOWN}$.

The rotational difference $\Delta N$ is set to the reference rotational difference $\Delta N_m$, and the oil pressure control flag F is turned OFF. At the same time, the value "1" is subtracted from the counted value C of the counter:

$\Delta N_m$←$\Delta N$;

F←OFF;

and

C←C−1(C=0 for C<0).

If it is decided at Step S1-12 of the first clutch release routine that the speed ratio e exceeds the constant $e_1$, it is confirmed that the first clutch C1 is released to some extent. As a result, the first clutch release routine is ended, but the first clutch C1 is not so released that the piston of the hydraulic servo C-1 will start its retraction. This makes it necessary to lower the C-1 oil pressure $P_{C1}$ so much that the first clutch C1 may transfer from the slip region to the drag region. Thus, the operation of Step S2-9 is repeated till the first clutch C1 transfers from the slip region to the drag region.

Once the first clutch C1 transfers from the slip region to the drag region, it is held in the stroke-end non-engaging state immediately before the transfer from the drag region to the slip region, so that the operation of Step S2-9 is not executed.

When the variation $\delta$ increases over the threshold value $\Delta N_{RC}$, the first clutch C1 can be released so long as the piston of the hydraulic servo C-1 starts its retraction without fail, by repeating the operation of lowering the C-1 oil pressure $P_{C1}$ by the set pressure $\Delta P_{DOWN}$.

Step S2-10: The C-1 oil pressure $P_{C1}$ before the pressure reduction at Step S2-9 is set as a reference C-1 oil pressure $P_{C1m}$ and is stored in the storage device (not shown):

$P_{C1m}$←$P_{C1}$ before the pressure reduction.

Step S2-11: The threshold value $\Delta N_{R1}$ is updated.

Step S2-12: It is decided whether or not the oil pressure control flag F is ON, that is, whether or not the C-1 oil pressure $P_{C1}$ is raised at the instant of elapse of the previous sampling time $T_{SAM}$. The routine advances to Step S2-13, if the oil pressure control flag F is ON, but to Step S2-16 if the oil pressure control flag F is OFF.

Step S2-13: Since the C-1 oil pressure $P_{C1}$ is raised by the set pressure $\Delta P_{UP}$ (because the oil pressure control flag F is ON) at the instant of lapse of the previous sampling time $T_{SAM}$ it is decided whether or not the variation $\delta$ or the remainder of the rotational difference $\Delta N$ from the reference rotational difference $\Delta N_m$ is below the threshold value $\Delta N_{Ri}$. The routine advances to Step S2-14, if the variation $\delta$ is below the threshold value $\Delta N_{Ri}$, but to Step S2-16 if the variation $\delta$ is over the threshold value $\Delta N_{Ri}$.

Step S2-14: As a result, that the C-1 oil pressure $P_{C1}$ is raised by the set pressure $\Delta P_{UP}$ at the instant of elapse of the previous sampling time $T_{SAM}$ the rotational difference $\Delta N$ has highly changed. It is, therefore, decided that the first clutch C1 has transferred from the drag region to the slip region, and the C-1 oil pressure $P_{C1}$ is lowered (or reduced) by the set pressure $\Delta P_{DOWN}$ at the later-described instant of Step S2-16:

$P_{C1}$←$P_{C1}-\Delta P_{DOWN}$.

The sampling time $T_{SAM}$ is reset, and the oil pressure control flag F is turned OFF. At the same time, the value "1" is added to the counted value C of the counter:

F←OFF;

and

C←C+1.

If, in this time, the C-1 oil pressure $P_{C1}$ is lowered by the set pressure $\Delta P_{DOWN}$, the first clutch C1 takes the stroke-end non-engaged state which is immediately before the transfer from the drag region to the slip region. It is, therefore, desired that the C-1 oil pressure $P_{C1}$ is raised again by the set pressure $\Delta P_{UP}$ at the instant when the varied C-1 oil pressure $P_{C1}$ is stabilized by lowering it by the set pressure $\Delta P_{DOWN}$. Therefore, it is detected that the C-1 oil pressure $P_{C1}$ has been lowered by the set pressure $\Delta P_{DOWN}$. At the instant of this detection, the sampling time $T_{SAM}$ is reset to start again the timing.

Thus, the C-1 oil pressure $P_{C1}$ is raised early by the set pressure $\Delta P_{UP}$ after it has been lowered by the set pressure $\Delta P_{DOWN}$, so that the first clutch C1 can be always held in the state immediately before the transfer from the drag region to the slip region.

If the reduction of the C-1 oil pressure $P_{C1}$ is detected when the variation δ exceeds the threshold value $\Delta N_{RC}$ after the sampling time $T_{SAM}$ has been reset, the operation of Step S2-9 is executed so that the C-1 oil pressure $P_{C1}$ is lowered by the not-shown second pressure reducing means.

When the C-1 oil pressure $P_{C1}$ is lowered by the set pressure $\Delta P_{DOWN}$, the reference rotational difference ΔNm is not set. Hence, the variation δ is the difference between the rotational difference ΔN and the preceding reference rotational difference ΔNm, so that δ basically is maintained at substantial zero. Hence, the C-1 oil pressure $P_{C1}$ can be raised by the set pressure $\Delta P_{UP}$ after it has been lowered by the set pressure $\Delta P_{DOWN}$. As a result, the operation of Step S2-9 is hardly executed.

Step S2-15: The C-1 oil pressure $P_{C1}$ before being lowered at Step S2-14 is set as the reference C-1 oil pressure $P_{C1m}$ and is stored in the storage device (not shown):

$P_{C1m} \leftarrow P_{C1}$ before being lowered.

Step S2-16: It is decided whether or not the condition for ending the in-neutral control of the first clutch C1 is satisfied. The in-neutral control routine is ended, if the ending condition is satisfied, but is returned to Step S2-4 to repeat the aforementioned operation, if the ending condition is not satisfied.

Figure 17:
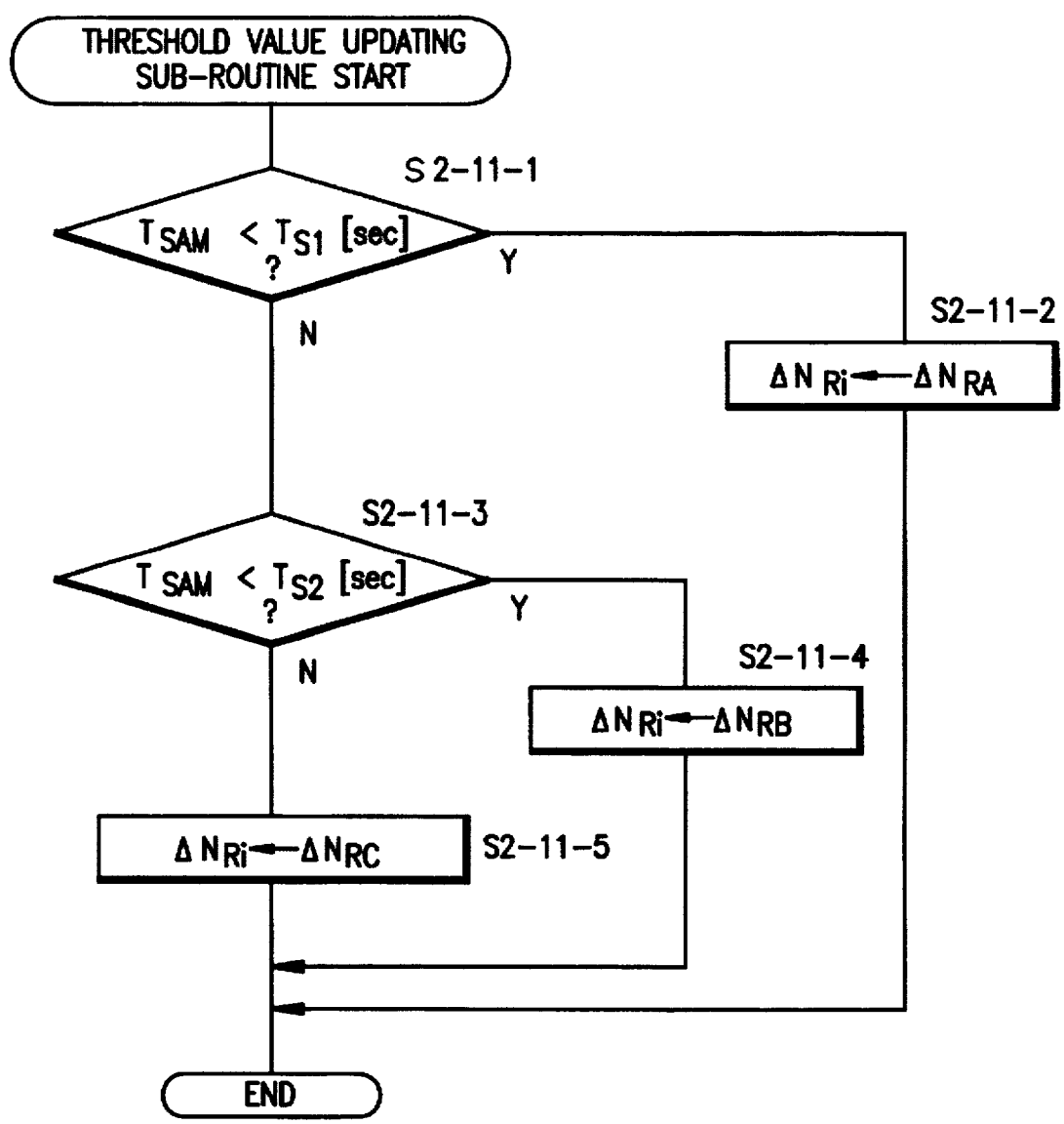
FIG. 17 is a flow chart of a threshold value updating routine in the first embodiment of the present invention.

The sub-routine for updating the threshold value $\Delta N_{R1}$ at Step S2-11 of FIG. 15 is shown in the flow chart of FIG. 17.

In the present embodiment: a threshold value $\Delta N_{RA}$ is set to 15 rpm; a threshold value $\Delta N_{RB}$ is set to 20 rpm; and a threshold value $\Delta N_{RC}$ is set to 30 rpm.

Step S2-11-1: It is decided whether or not a time period (as will be called the "elapsed time") $T_{SAM}$ as elapsed from the start of timing of the sampling time $T_{SAM}$ is shorter than the time $T_{S1}$. The routine advances to Step S2-11-2, if the elapsed time $T_{SAM}$ is shorter than the time $T_{S1}$, but to Step S2-11-3 if the lapse time $T_{SAM}$ is longer than the time $T_{S1}$.

Step S2-11-2: The value $\Delta N_{RA}$ is set as the threshold value $\Delta N_{Ri}$.

Step S2-11-3: It is decided whether or not the elapsed time $T_{SAM}$ is shorter than the time $T_{S2}$. The routine advances to Step S2-11-4, if the elapsed time $T_{SAM}$ is shorter than the time $T_{S2}$, but to Step S2-11-5 if the elapsed time $T_{SAM}$ is longer than the time $T_{S2}$.

Step S2-11-4: The value $\Delta N_{RB}$ is set as the threshold value $\Delta N_{Ri}$.

Step S2-11-5: The value $\Delta N_{RC}$ is set as the threshold value $\Delta N_{Ri}$.

Figure 18:
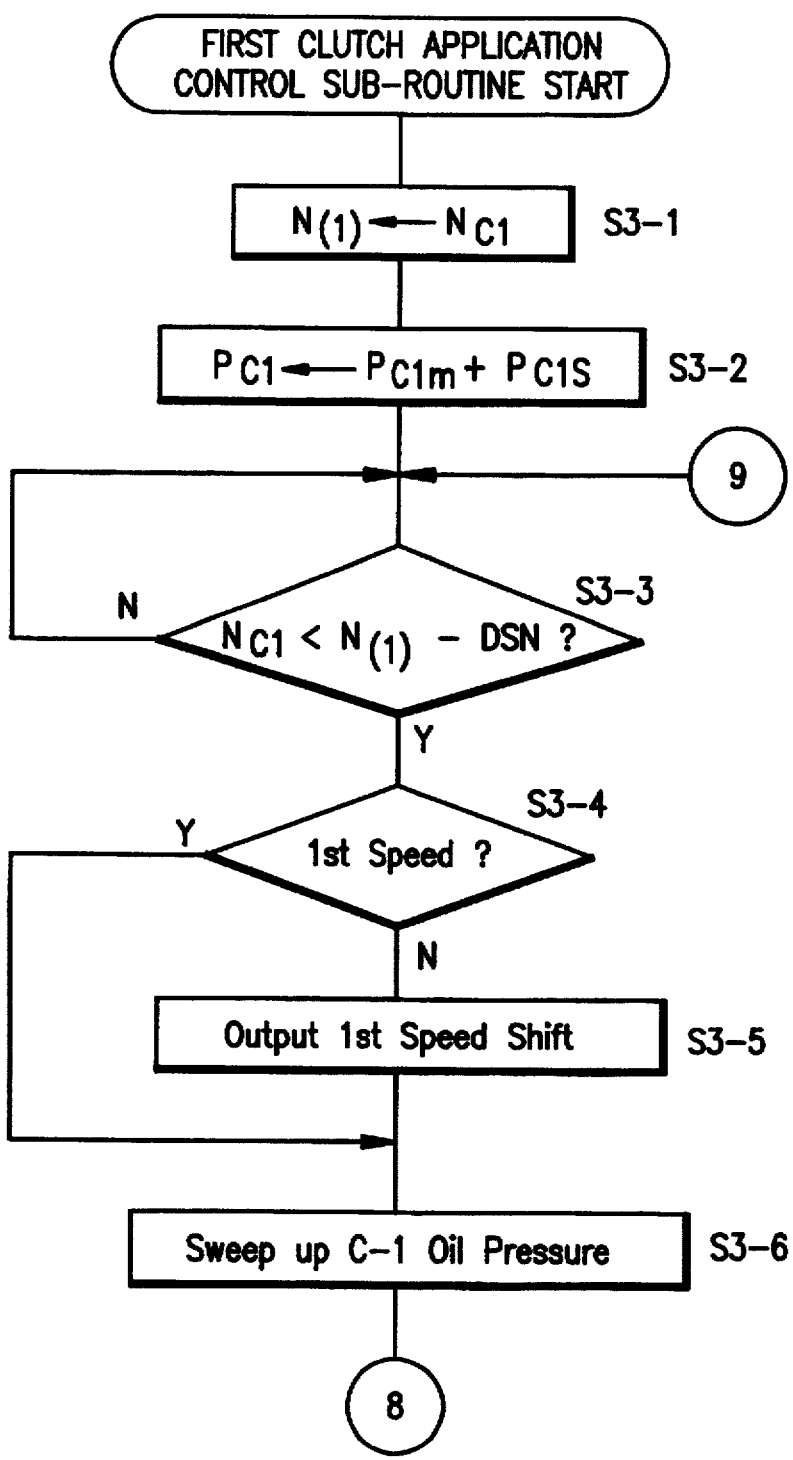
FIG. 18 is a flow chart of a first portion of a first clutch application control routine in the first embodiment.
Figure 19:
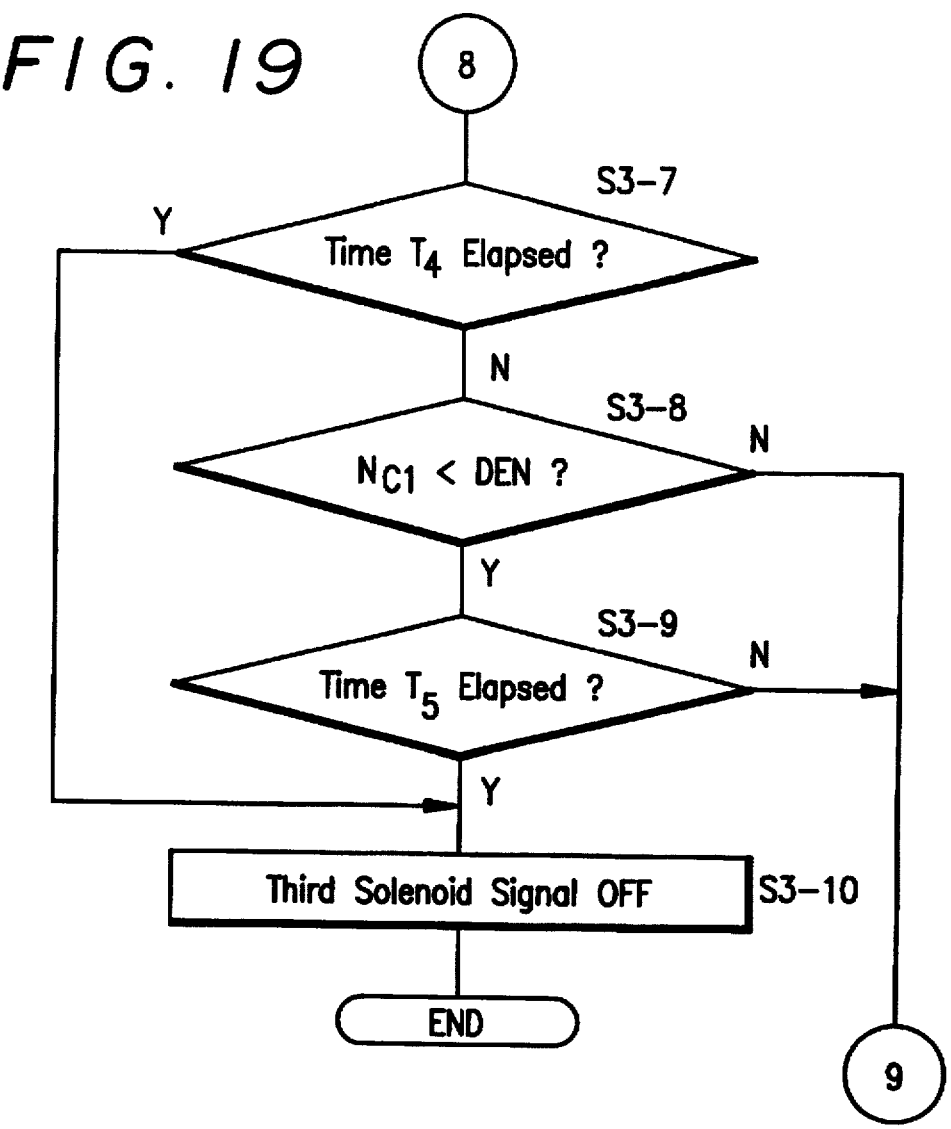
FIG. 19 is a flow chart of a second portion of the first clutch application control routine in the first embodiment.
Figure 20:
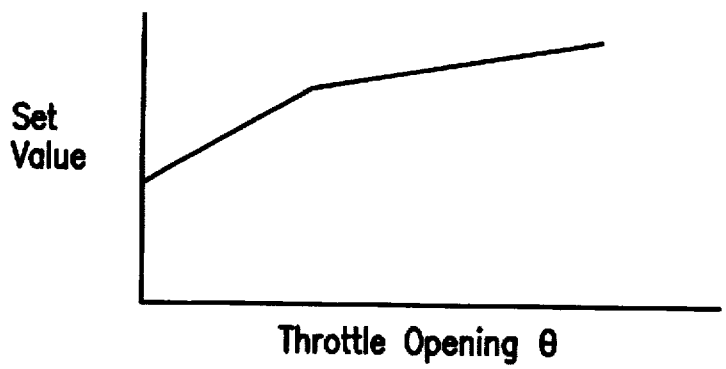
FIG. 20 is a graph showing a relationship between a throttle opening and a set value in the first embodiment.

The first clutch application control subroutine at Step S3 of FIG. 6 is illustrated in the flow charts of FIGS. 18 and 19 and in the graph of FIG. 20. The abscissa of FIG. 20 indicates the throttle opening δ, and the ordinate indicates the set value.

Step S3-1: The clutch input side RPM $N_{C1}$ at the instant when the ending condition of the in-neutral control is satisfied is stored as a value $N_{(1)}$ in the memory of the automatic transmission control system 41 (FIG. 2). Simultaneously with this, the timing of the third timer is started.

Step S3-2: A constant $P_{C1S}$ is added as a shelf pressure to the reference C-1 oil pressure $P_{C1m}$ as the base pressure which is set at Steps S2-10 and S2-15, and this summation is set as the C-1 oil pressure $P_{C1}$. The constant $P_{C1S}$ is selected so as to moves the piston of the hydraulic servo C1 (FIG. 5) without fail and to weaken the application shock to be caused by the application.

When the driver performs the starting operation so that the transfer of the vehicle from the stop state to the start state is detected, the constant $P_{C1S}$ is added to the reference C-1 oil pressure $P_{C1m}$ so that the oil pressure to be fed to the hydraulic servo C-1 is raised to bring the first clutch C1 into a partially applied state. Subsequently, the oil pressure to be fed to the hydraulic servo C-1 is further raised to bring the first clutch C1 into the completely applied state.

Step S3-3: It is awaited that the clutch input side RPM $N_{C1}$ becomes smaller than the remainder of the value $N_{(1)}$, from a constant DSN. If the clutch input side RPM $N_{C1}$ becomes smaller than the remainder of the value $N_{(1)}$, from the constant DSN, the routine decides the start of application of the first clutch C1 and advances to Step S3-4.

Step S3-4: It is decided whether or not the gear stage is at the 1st speed. The routine advances to Step S3-6, if at the 1st: speed, but to Step S3-5 if not at the 1st speed.

Step S3-5: The 1st speed shift output is generated.

Step S3-6: The throttle pressure $P_{TH}$ from the linear solenoid valve 66 (FIG. 4) is changed to set the C-1 oil pressure $P_{C1}$ to a pressure $P_B$ (FIG. 7), and this C-1 oil pressure $P_{C1}$ is then swept up. After this, the C-1 oil pressure $P_{C1}$ is raised by a set pressure $\Delta P_B$ at each lapse of a time $\Delta t_B$ to continue the application of the first clutch C1.

Step S3-7: It is decided whether or not a time $T_4$, as timed by the third timer, has elapsed. The routine advances to Step S3-10, if the time $T_4$ elapses, but to Step S3-8 if the time $T_4$ does not elapse.

Step S3-8: It is decided whether or not the clutch input RPM $N_{C1}$ is below a constant DEN. The routine advances to Step S3-9, if the clutch input RPM $N_{C1}$ is over the constant DEN, but returns to Step S3-3 if the clutch input RPM $N_{C1}$ is below the constant DEN. If it is decided that the clutch input RPM $N_{C1}$ is below the constant DEN, the fourth timer starts the timing.

Step S3-9: It is decided whether or not a time T5, as timed by the fourth timer, has elapsed. The routine advances to Step S3-10, if the time $T_5$ elapses, but returns to Step S3-3 if the time $T_5$ does not elapse.

In this case, the set values such as the constant $P_{C1S}$, the pressure $P_B$ or the set pressure $\Delta P_B$ are set on the basis of the variable such as the throttle opening θ as corresponding to the input torque $T_T$.

Step S3-10: The third solenoid signal S3 is turned OFF.

In the present embodiment, the standard rates of change $\rho_1$ and $\rho_2$ respectively in the drag region and the slip region, when the C-1 oil pressure $P_{C1}$, are determined, and a value between the two change rates $\rho_1$ and $\rho_2$ is suitably selected and is set as the reference rate of change $\rho_{REF}$ SO that the threshold value $\Delta N_{RC}$ is set to correspond to the reference change rate $\rho_{REF}$.

As a result, the threshold value $\Delta N_{RC}$, as set to correspond to the reference change rate $\rho_{REF}$ is used when the C-1 oil pressure $P_{C1}$ is raised at Step S2-8 by the booster means 107 of the specific release state holding means 105 (FIG. 1) and when the C-1 oil pressure is lowered at Step S2-9 by the aforementioned second pressure reducing means.

Here will be described the cases in which the reference change rate $\rho_{REF}$ is set to a value slightly larger than the standard change rate $\rho_1$ in the drag region and in which the reference change rate $\rho_{REF}$ is set to a value slightly smaller than the standard change rate $\rho_2$.

Figure 21:
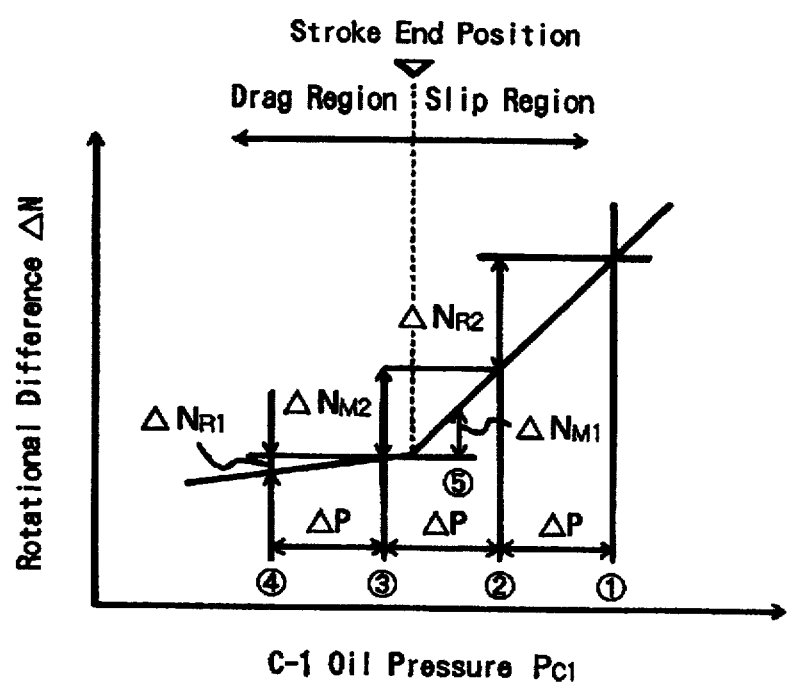
FIG. 21 is a graph explaining the state of the clutch of the present invention.

FIG. 21 is a diagram for explaining the state of the clutch of the present invention. The abscissa of FIG. 21 indicates the C-1 oil pressure $P_{C1}$, and the ordinate indicates the rotational difference $\Delta N$. For convenience of explanation, it is assumed that both the set pressure $\Delta P_{UP}$ for raising the C-1 oil pressure $P_{C1}$ by the booster means 107 of the specific release state holding means 105 (FIG. 1) and the set pressure $\Delta P_{DOWN}$ for lowering the C-1 oil pressure $P_{C1}$ by the pressure reducing means are at the same value $\Delta P$.

Here, the following formulas hold if the variation corresponding to the standard change rate $\rho_1$ in the drag region is designated by $\Delta N_{R1}$ and if the variation corresponding to the standard change rate $\rho_2$ in the drag region is designated by $\Delta NR_2$:

$$\Delta N_{R1} = \rho_1 \cdot T_{SAM};$$

and $$\Delta N_{R2} = \rho_2 \cdot T_{SAM}.$$

Here are also assumed values $\Delta N_{M1}$ and $\Delta N_{M2}$ which are larger than the variation $\Delta N_{R1}$ and smaller than the variation $\Delta N_{R2}$ as follows:

$$\Delta N_{M1} < \Delta N_{M2}.$$

The value $\Delta N_{M2}$ is equalized to the variation of the rotational difference $\Delta N$ when the state transfers between the drag region and the slip region.

If the threshold value $\Delta N_{RC}$ is set to the value $\Delta N_{M1}$ approximate the variation $\Delta N_{R1}$, the rotational difference $\Delta N$ changes, as follows:

Specifically, if the C-1 oil pressure $P_{C1}$ is lowered in the state ① by the value $\Delta P$, the state transfers to state ②, but the variation $\Delta N_{R2}$ of the rotational difference $\Delta N$ in this meanwhile is higher than the value $\Delta N_{M1}$ so that the C-1 oil pressure $P_{C1}$ is lowered by the value $\Delta P$ to invite the state ③. The variation of the rotational difference $\Delta N$ in the course of transfer from the state ② to the state ③ is equal to the value $\Delta N_{M2}$ and larger than the value $\Delta N_{M1}$ so that the C-1 oil pressure $P_{C1}$ is further lowered by the value $\Delta P$ to invite the state ④.

Next, the variation $\Delta N_{R1}$ of the rotational difference $\Delta N$ in the course of transfer from the state ③ to the state ④ is smaller than the value $\Delta N_{M1}$ so that the C-1 oil pressure $P_{C1}$ is raised by the value $\Delta P$ to invite the state ③.

Since the variation $\Delta N_{R1}$ of the rotational difference $\Delta N$ in the course of transfer from the state ④ to the state ③ is smaller than the value $\Delta N_{M1}$, the C-1 oil pressure $P_{C1}$ is then raised by the value $\Delta P$. If, however, the transfer is made from the drag region (state ③) to the slip region (state ②), as shown, the variation of the rotational difference $\Delta N$ changes from the value $\Delta N_{R1}$ to the value $\Delta N_{M2}$. In the state ② before the lapse of the sampling time $T_{SAM}$ therefore, the first pressure reducing means 108 decides that the variation of the rotational difference $\Delta N$ exceeds the value $\Delta N_{m1}$. As a result, the C-1 oil pressure $P_{C1}$ is lowered by the value $\Delta P$ to invite the state ③.

If the sampling time $T_{SAM}$ is then reset, as shown in FIG. 14, so that the C-1 oil pressure $P_{C1}$ is raised by the value $\Delta P$ each time of lapse of the sampling time $T_{SAM}$ to effect the transfer from the drag region to the slip region, the C-1 oil pressure $P_{C1}$ is lowered by the value $\Delta P$. As a result, the states ③ and ② are alternately invited.

Thus, if the threshold value $\Delta N_{RC}$ is set to the relatively small value $\Delta N_{M1}$, the region is decided by mistake to belong to the slip region although it has already transferred to the drag region in the state ③ so that the C-1 oil pressure $P_{C1}$ is lowered by the value $\Delta P$ to invite the state ④.

On the other hand, if the threshold value $\Delta N_{RC}$ is set to the value $\Delta N_{M2}$ approximate the variation $\Delta N_{R2}$, the rotational difference $\Delta N$ changes, as follows:

Specifically, if the C-1 oil pressure $P_{C1}$ is lowered in the state ① by the value $\Delta P$, the state transfers to ②, but the variation $\Delta N_{R2}$ of the rotational difference $\Delta N$ in this meanwhile is higher than the value $\Delta N_{M2}$ SO that the C-1 oil pressure $P_{C1}$ is lowered by the value $\Delta P$ to invite the state ③. The variation of the rotational difference $\Delta N$ in the course of transfer from the state ② to the state ③ is equal to the value $\Delta N_{M2}$ so that the C-1 oil pressure $P_{C1}$ is raised by the value $\Delta P$ to invite the state ②. After this, the states ③ and ② are alternately invited.

Thus, if the threshold value $\Delta N_{RC}$ is set to the relatively large value $\Delta N_{M2}$, it is compared with the value $\Delta N_{M2}$ in the state ② after the variation of the rotational difference $\Delta N$ has increased, so that the first clutch C1 vibrates.

Therefore, here will be described a second embodiment which is modified so that the drag region may not transfer to the slip region if the C-1 oil pressure $P_{C1}$ is raised by the booster means 107, and so that the C-1 oil pressure $P_{C1}$ may not become excessively low if the C-1 oil pressure $P_{C1}$ is lowered in the slip region by the second pressure reducing means.

In this case, the reference rate of change, as set in the second pressure reducing means 108, is made higher than that set by the specific release state holding means 105.

In the slip region, therefore, a threshold value $\Delta N_{RC1}$ is set to a value smaller than the variation $\Delta NR_2$ and larger than the value $\Delta N_{M2}$ for example, in a manner to correspond to the reference rate of change, as set in the second pressure reducing means. In the drag region, on the other hand, a threshold value $\Delta N_{RC2}$ is set to a value larger than the variation $\Delta N_{R1}$ and smaller than the value $\Delta N_{M1}$, for example, in a manner to correspond to the reference rate of change, as set in the booster means 107 or the specific release state holding means 105.

As a result, the reference rates of change can be so set as to suit the second pressure reducing means and the specific release state holding means, respectively.

Figure 22:
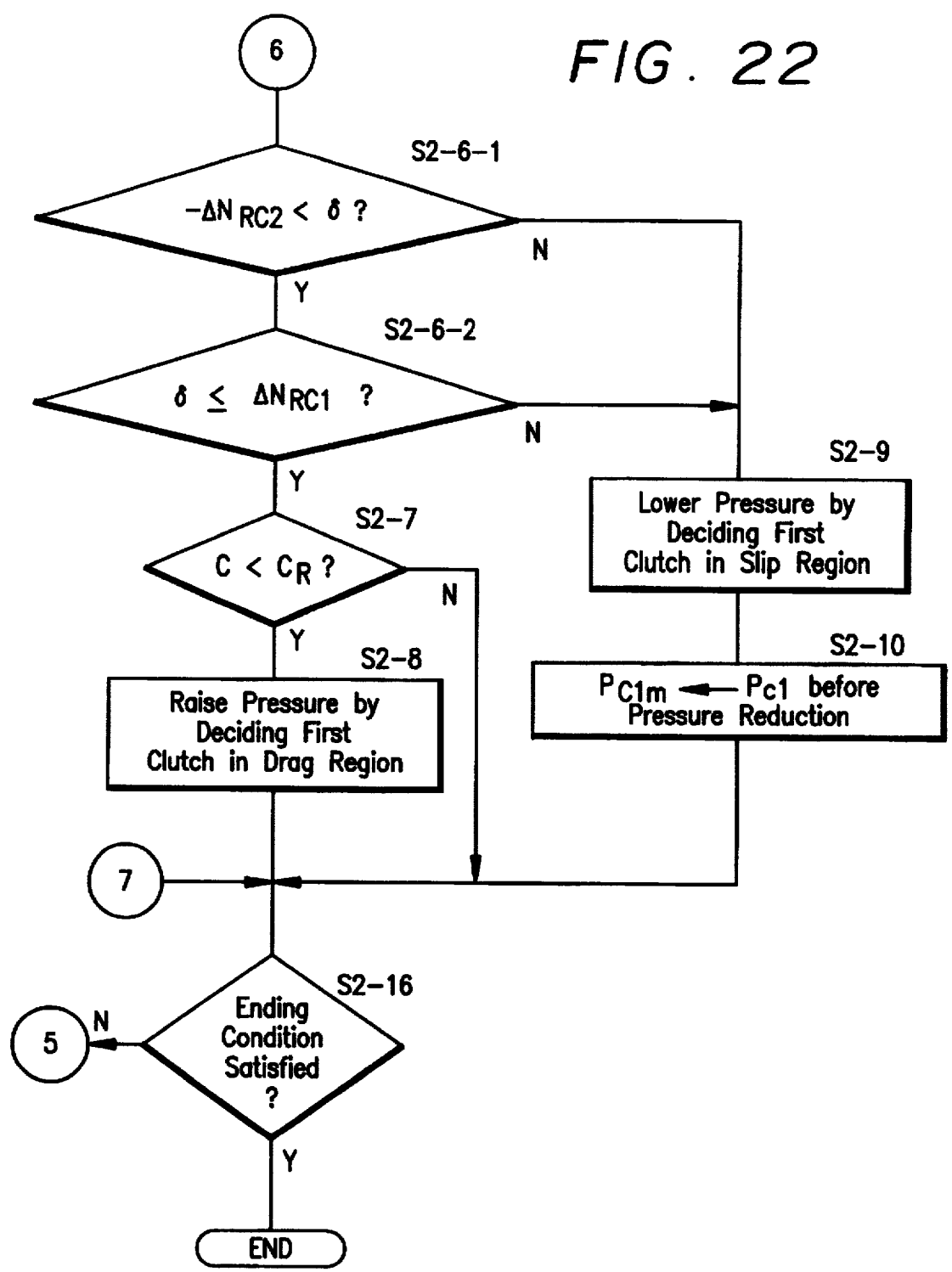
FIG. 22 is a flow chart of an in-neutral control in a second embodiment of the present invention.

FIG. 22 is a flow chart of an in-neutral control in the second embodiment of the present invention. The description of the steps having the same contents as those of the first embodiment will be omitted by designating them at the same step numbers.

Step S2-6-1: It is decided whether or not the variation $\delta$ is larger than the threshold value $-\Delta N_{RC2}$. The routine advances to Step S2-6-2, if the variation $\delta$ is over the threshold value $-\Delta N_{RC2}$ but to Step S2-9 if the variation $\delta$ is below the threshold value $-\Delta N_{RC2}$.

Step S2-6-2: It is decided whether or the variation $\delta$ is smaller than the threshold value $\Delta N_{RC1}$. The routine advances to Step S2-7, if the variation is below the threshold value $\Delta N_{RC1}$, but to Step S2-9 if the variation $\delta$ is over the threshold value $\Delta N_{RC1}$.

Figure 23:
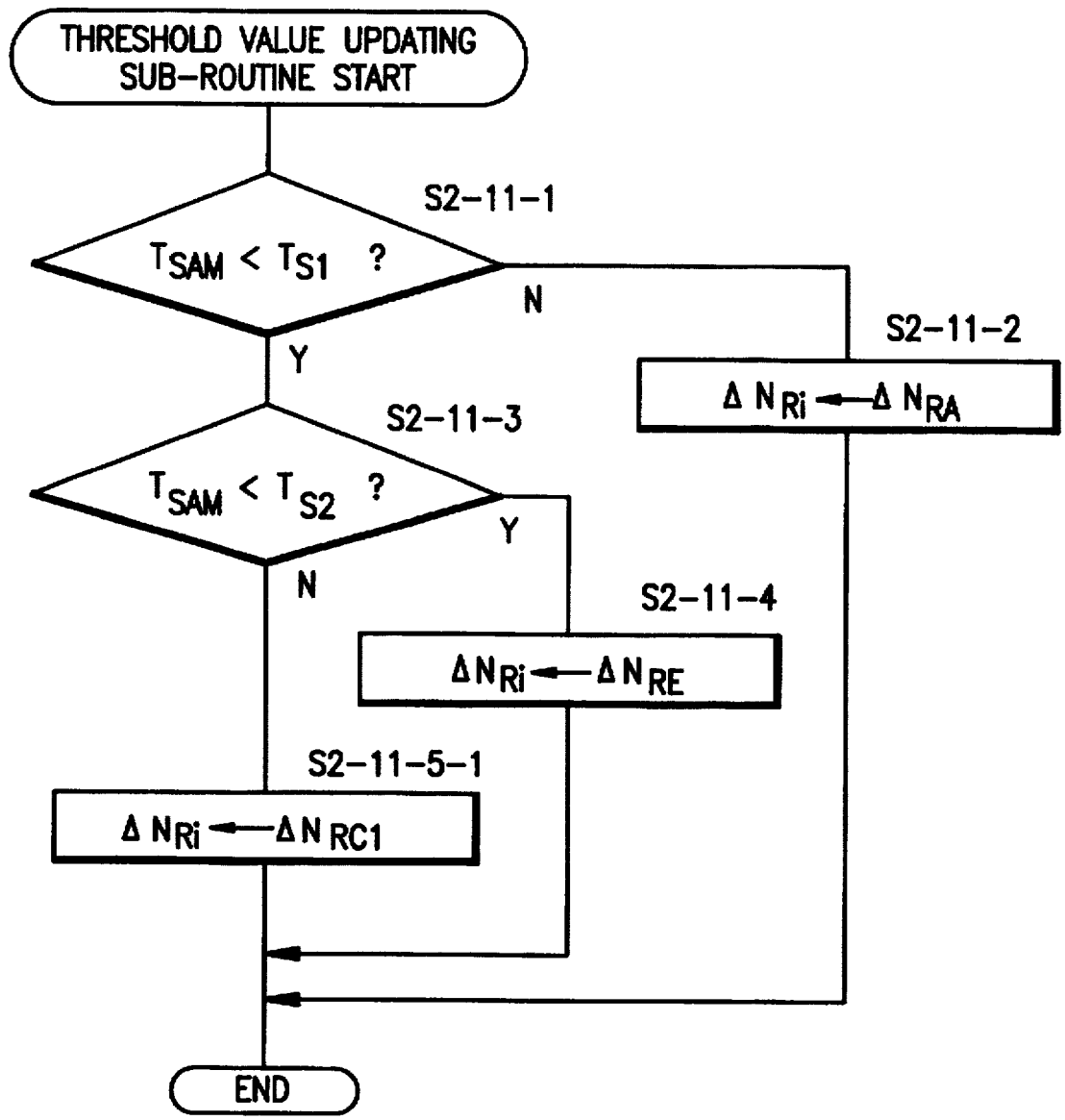
FIG. 23 is a flow chart of a threshold value updating routine in the second embodiment.

FIG. 23 is a flow chart of a threshold value updating routine in the second embodiment of the present invention.

The description of the steps having the same contents as those of the first embodiment will be omitted by designating them at the same step numbers.

Step S2-11-5-1: The value $\Delta N_{RC1}$ is set as the threshold value $\Delta N_{R1}$.

The present invention is not limited to the above described embodiments but is subject to many modifications, variations and changes in detail without departing from the scope and spirit of the invention.

What is claimed is:

1. A control system for an automatic transmission having a speed change unit with a transmission mechanism, the control system comprising: a fluid transmission unit for transmitting rotation of an engine to the speed change unit; a clutch adapted to be applied when a forward running range is selected to transmit the rotation of said fluid transmission unit to the transmission mechanism of said speed change unit; a hydraulic servo for applying/releasing said clutch; stop state detecting means for detecting a vehicle stop state which is defined by (a) a forward running range being selected, (b) a throttle opening being fully closed, (c) a brake pedal being depressed, and (d) a vehicle speed being substantially zero; input speed detecting means for detecting the input rotational speed of said fluid transmission unit; output speed detecting means for detecting the output rotational speed of said fluid transmission unit; hydraulic control means for controlling oil pressure fed to said hydraulic servo; and a control unit, wherein said control unit includes: calculation means for calculating the rotational difference between said input speed and said output speed; release means for releasing said clutch by lowering the oil pressure fed to said hydraulic servo until the retraction of the piston of said hydraulic servo is started when said vehicle stop state is detected; and specific release state holding means for holding the clutch in a released state immediately before the transfer of said clutch from a drag region to a slip region until said vehicle stop state is not detected after the release of said clutch, and wherein said specific release state holding means includes: booster means for raising the oil pressure fed to said hydraulic servo by a set pressure unless a rate of change of said rotational difference exceeds a reference rate of change even after lapse of a set time period; and first pressure reducing means for lowering the oil pressure fed to said hydraulic servo by a set pressure if said rate of change exceeds the reference rate irrespective of the lapse of said set time period and if the rotational difference increases.

2. A control system for an automatic transmission according to claim 1, wherein said reference rate of change is set at a value between a standard drag rate of change when said clutch is in the drag region if the oil pressure is changed by said set pressure, and a standard slip rate of change when said clutch is in the slip region.

3. A control system for an automatic transmission according to claim 1, wherein said set time period is set to correspond to a time period during which a change in oil pressure fed to the hydraulic servo by said set pressure continues to change until the actual rate of change of the oil pressure ends.

4. A control system for an automatic transmission according to claim 1, wherein said release means includes second pressure reducing means for reducing the oil pressure fed to said hydraulic servo by said set pressure if said rate of change exceeds the reference rate of change while said rotational difference decreases until said set time elapses.

5. A control system for an automatic transmission according to claim 4, wherein the reference rate of change, as set by said second pressure reducing means, is higher than that which is set by said specific release state holding means.

* * * * *

UNITED STATES PATENT AND TRADEMARK OFFICE
CERTIFICATE OF CORRECTION

PATENT NO. : 5,800,308
DATED : September 1, 1998
INVENTOR(S) : TSUTSUI et al

It is certified that error appears in the above-indentified patent and that said Letters Patent is hereby corrected as shown below:

Col. 3, line 18, delete "this" insert --the--.
Col. 7, line 24, delete "132" insert --B2--.
Col. 8, line 57, "411" should read --41--.
Col. 10, line 61, begin a new paragraph with "Step".
Col. 18, line 15, "moves" should read --move--.
Col. 20, line 39, "ΔNR$_2$" should read --ΔN$_{R2}$--.

Signed and Sealed this

Seventeenth Day of August, 1999

Q. TODD DICKINSON

Attest:

Attesting Officer

Acting Commissioner of Patents and Trademarks